Dec. 20, 1955 A. D. LUND 2,727,287

STORAGE BATTERY GROUP ASSEMBLY AND TERMINAL CASTING FIXTURE

Filed Sept. 4, 1951 13 Sheets-Sheet 1

INVENTOR.
ARTHUR D. LUND
BY
Carlsen + Hagle
ATTORNEYS

Dec. 20, 1955 A. D. LUND 2,727,287

STORAGE BATTERY GROUP ASSEMBLY AND TERMINAL CASTING FIXTURE

Filed Sept. 4, 1951 13 Sheets-Sheet 2

INVENTOR.

ARTHUR D. LUND

BY

Carlsen & Hagle

ATTORNEYS

INVENTOR.
ARTHUR D. LUND
BY
ATTORNEYS

INVENTOR.
ARTHUR D. LUND
BY
Carlson & Hagle
ATTORNEYS

Dec. 20, 1955 A. D. LUND 2,727,287

STORAGE BATTERY GROUP ASSEMBLY AND TERMINAL CASTING FIXTURE

Filed Sept. 4, 1951 13 Sheets-Sheet 5

INVENTOR.
ARTHUR D. LUND
BY
Carlsen & Hagle
ATTORNEYS

Dec. 20, 1955 A. D. LUND 2,727,287

STORAGE BATTERY GROUP ASSEMBLY AND TERMINAL CASTING FIXTURE

Filed Sept. 4, 1951 13 Sheets-Sheet 6

INVENTOR.
ARTHUR D. LUND
BY
Carlsen & Hagle
ATTORNEYS

STORAGE BATTERY GROUP ASSEMBLY AND TERMINAL CASTING FIXTURE

Filed Sept. 4, 1951

INVENTOR.
ARTHUR D. LUND
BY
Carlsen & Hagen
ATTORNEYS

INVENTOR.
ARTHUR D. LUND
BY Carlsen & Hagle
ATTORNEYS

Dec. 20, 1955 A. D. LUND 2,727,287

STORAGE BATTERY GROUP ASSEMBLY AND TERMINAL CASTING FIXTURE

Filed Sept. 4, 1951 13 Sheets-Sheet 9

INVENTOR.

ARTHUR D. LUND

BY Carlsen + Hagle

ATTORNEYS

STORAGE BATTERY GROUP ASSEMBLY AND TERMINAL CASTING FIXTURE

Filed Sept. 4, 1951

INVENTOR.

ARTHUR D. LUND

BY Carlsen + Hagles

ATTORNEYS

INVENTOR.
ARTHUR D. LUND
BY Carlsen & Hagle
ATTORNEYS

Dec. 20, 1955

A. D. LUND 2,727,287

STORAGE BATTERY GROUP ASSEMBLY AND TERMINAL CASTING FIXTURE

Filed Sept. 4, 1951

13 Sheets-Sheet 12

INVENTOR.

ARTHUR D. LUND

BY Carlsen & Hagle

ATTORNEYS

Dec. 20, 1955 A. D. LUND 2,727,287

STORAGE BATTERY GROUP ASSEMBLY AND TERMINAL CASTING FIXTURE

Filed Sept. 4, 1951 13 Sheets-Sheet 13

INVENTOR.
ARTHUR D. LUND
BY Carlsen & Hagle
ATTORNEYS

United States Patent Office 2,727,287

Patented Dec. 20, 1955

2,727,287

STORAGE BATTERY GROUP ASSEMBLY AND TERMINAL CASTING FIXTURE

Arthur D. Lund, Minneapolis, Minn., assignor, by mesne assignments, to Gould-National Batteries, Inc., St. Paul, Minn., a corporation of Delaware Application September 4, 1951, Serial No. 244,935

8 Claims. (Cl. 22—58)

This invention relates to improvements in the art of storage battery manufacture, and more specifically to the final assembly of the plates and separators which go into the individual cells of the battery.

As is well known to those skilled in the art the assembly of the properly interleaved, positive and negative plates, and intervening separators, with the terminal straps and posts by which the plates must be connected has long represented a problem, for a number of reasons. The common battery plate comprises a rectilinear grid-like structure for containing the pasty activating material and from each plate there upwardly extends a terminal lug, usually arranged at an upper corner of the plate. In group assembly the positive and negative plates are alternated, with all of the lugs for the plates of a corresponding polarity located at the same end of the group. These lugs must then be connected by a cross strap called a bus bar, forming part of which is an upwardly projecting post for making connections exteriorly of the cell itself, and for both mechanical and electrical reasons the union between the bus bars and the lugs must be extremely good. The problem is complicated by the fact that the individual plates are each separated from the one next thereto by the intervening insulating separators. At present the practice is to employ pre-cast posts and bus bars with the latter notched or slotted to fit the upper ends of the terminal lugs. It can well be appreciated that holding all of these separate pieces in proper position to space the lugs to fit the notched bus bars, while fitting the bus bars to the lugs, and then applying sufficient heat to fuse the material of the bus bar and lugs without damaging the separators, is a complicated and expensive operation.

Various attempts have been made to mechanize this group assembly and post burning operation, an example of which is found in the Brown Patent No. 2,516,546 which provides an assembly jig with relatively movable parts into which the properly interleaved plates and separators may be dropped in a more or less haphazard fashion, and then by adjustment of said movable parts in planes at right angles to each other, the plates and separators may be compacted together as well as brought into proper alignment with each other as discussed in detail in that patent. Furthermore, the fixture therein disclosed includes oppositely movable combs having pointed teeth adapted to move between and properly space the plate lugs to insure their being in proper relative positions for the accommodation of a pre-cast post with slotted bus bar. The fixture disclosed in the Brown patent identified furthermore solves one problem of long standing having to do with the proper positioning of the separators while the burning operation is carried out, so as to prevent damage to these insulators by heat. For this purpose the jig is arranged for turnover movement from an inverted loading position, wherein the plates are disposed in the fixture with the lugs downward so that the extended upper edges of the plates and separators will contact a bottom member, leaving the lugs themselves projecting beyond the adjacent edges of the separator. In such inverted position the jig is then closed to grip and align the group, whereupon the jig is swung through a half turn to bring the lugs up to the top for most convenient application of the pre-cast posts and the burning of the bus bars to the lugs. My invention has this turnover movement of the fixture from loading to working positions in common with this Brown patent.

The use of pre-cast posts is undesirable for the reasons that their application and fitting to the group prior to burning requires a comparatively delicate operation and very thorough burning is necessary to properly bond and fuse the bus bars and lugs together in order to provide a structure which is not only strong mechanically but which will have low electrical resistance and high current carrying capacity. Over and above this the pre-casting of the posts obviously requires operation of a separate casting machine and the accumulation of a considerable stock or inventory of posts, the latter being particularly true since battery plates are customarily used in a number of standard thicknesses and different posts are necessary to fit the different groups.

Bearing the foregoing in mind it is the primary object of my present invention to provide a fixture which will carry out in a better way all of the teachings of the Brown patent insofar as loading, aligning and accurately locating the lugs are concerned, and which further includes means for casting the terminal posts and bus bars directly upon the assembled plate groups or packs, making it entirely unnecessary to use pre-cast posts, and thus with one stroke overcoming all of the disadvantages pointed out supra. Another object is to provide a fixture for combining and carrying out the foregoing operations by means of which a comparatively haphazardly accumulated group of plates and separators may be accurately aligned and compacted and in such position firmly held while the casting operation is carried out, and with provision made in the means for casting the posts for opening a part of the mold structure to expose the upper surfaces of the bus bars so that the burning operation may be also carried out as soon as the castings have cooled sufficiently to permit opening of these mold sections. It may be possible that casting of the posts and bus bars directly upon the group would make it technically unnecessary to add the burning operation, but the savings made possible in other steps of the operation will permit the burning still at comparatively great saving in the end product, and in any event the burning operation will insure an extremely thorough union of the bus bars to the lugs.

A further important object of my present invention is to provide a bus bar-to-lug connection which will not only be strong mechanically, and effective electrically, but will also reduce the amount of lead required for each indiivdual post and bus bar unit. This is accomplished without reduction in the current carrying capacity of the bus bar and the cumulative saving thus afforded will be a considerable item over a year's time.

Another object of my invention is to provide a fixture of this nature and for this purpose with numerous refinements in mechanical construction and with the various operations so arranged that while they are herein disclosed as carried out manually, they lend themselves to automatic operation, so that the only manual operations then required would be the loading and unloading. Thus the process might be further accelerated to reduce the per unit cost of assembled groups. A further and related object is the provision of mechanism for conveniently and quickly accommodating the receiving and clamping portion of the fixture to battery groups having different numbers of plates or plates of different thicknesses, and to so mount the mold elements that they may be conveniently bodily removed for replacement with others as necessary to accommodate the fixture to other groups.

These and other more detailed and specific objects will be disclosed in the course of the following specification, reference being had to the accompanying drawings, in which—

Figure 1:
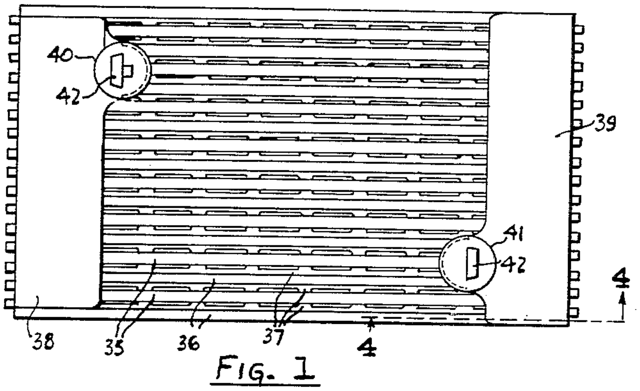
Fig. 1 is a top plan view of a battery group or pack ready for assembly into a cell of the storage battery, and as here shown the group comprises nine negative and eight positive plates, with interleaved separators, making a seventeen plate group, and in this view also the terminal posts and bus bars are shown as cast in place by the fixture of my present invention.
Figures 4, 5:
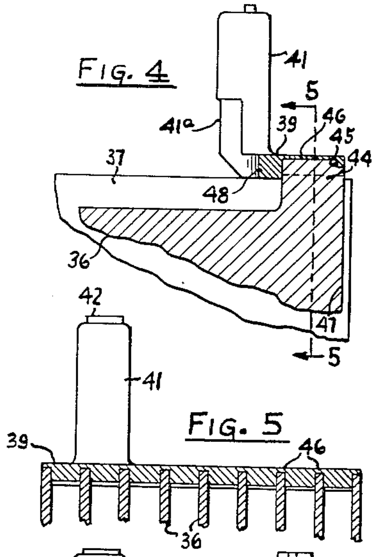
Fig. 4 is a sectional detail view along the line 4—4 in Fig. 1, showing the union between the negative plate lug and bus bar.
Fig. 5 is a cross sectional view through the upper corner portion of the group along the line 5—5 in Fig. 4.
Figure 2:
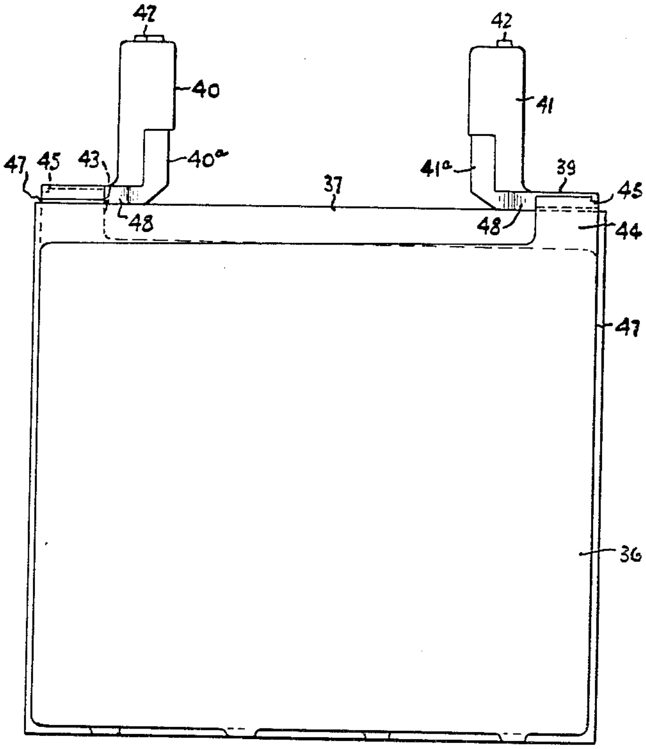
Fig. 2 is a side view of the group shown in Fig. 1.
Figure 3:
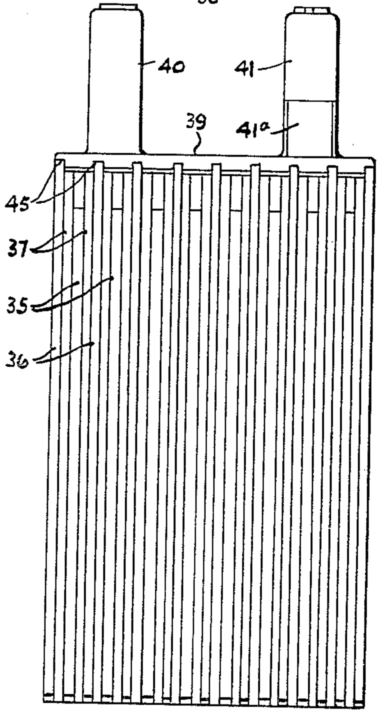
Fig. 3 is an end view of the group.

Referring now more particularly and by reference characters to the drawing, I will first describe the arrangement and construction of the plate and separator group shown in Figs. 1–5, and where component parts of this group appear in the remaining drawings they will be designated by corresponding reference characters. As standard items the group comprises a plurality of parallel positive plates, indicated throughout at 35, and negative plates 36, between which are interleaved insulating separator plates 37. In the assembly here shown there are nine negative plates and eight positive plates forming a seventeen plate group, and it will be noted that the separators 37 are conventionally provided with ribs upon one side, with these ribs facing the positive plates in all cases. Note that in the finished group the separators 37 extend at upper edges above the corresponding edges of the plate. The battery plates themselves are, of course, formed with a mesh of connecting wires and ribs in order to contain the pasty active material, but for convenience these elements are not shown in the drawing. In assembling the group of plates and separators it is necessary that they be stacked in the proper order, and furthermore the separators themselves must be so located during the casting operation that their upper edges will stand as far as possible from the site of this operation to prevent injury from the heat. In order to connect all of the positive plates together, and similarly connect all of the negative plates together, separate bus bars 38 and 39 traverse the group at its opposite ends, it being of course understood that in making the assembly the terminal lugs, with which the plates are conventionally provided, are properly arranged to engage these bus bars. Electrical and mechanical connection must be made between the bus bars 38—39 and the lugs in order to pass current and hold the group in assembly and alignment, and thus the union between the lugs and bus bars is quite critical. Each bus bar is provided with an upwardly projecting terminal post, indicated at 40 and 41 respectively, of circular cross section and in the group shown these are located adjacent diagonally related corners of the group. Lower portions of these posts 40—41 are reduced in diameter over half their circumference, as indicated at 40a and 41a respectively, for the purpose of saving material and the upper end faces of the posts carry the conventional marking ribs 42 indicating polarity.

Each battery plate 35—36 is, as stated, provided at one upper end corner with a lug and for the positive plates these lugs are designated at 43, while the negative plate lugs are designated at 44. In the ordinary case these lugs are rectangular in shape and straight across their upper edges, and in casting or burning the bus bars to the lugs there remains a thin, overlying coating of lead entirely across the upper edges of the lugs. In addition, the material of the bus bar flows down between the lugs for a short distance and at the inner sides of the lugs there is a strip of material running the full width of the assembled negative or positive plates which unites the bus bar with the terminal post and forms an overall strap-like connection of a cross section area more than sufficient to carry the comparatively heavy currents involved. In most cases also there is a projecting strip of the bus bar material running across the outer edges of the lugs, and it will be readily appreciated that where batteries are manufactured in large quantities the volume of metal required for the posts and bus bars is a large factor and any reduction in the metal required, without seriously reducing the current carrying capacity or mechanically weakening the construction, will in the aggregate represent a considerable saving. At this point, therefore, I direct attention particularly to Fig. 4 wherein the lug 44 is shown as formed on its upper outer corner with a notch 45 and in which the width and depth of the bus bar 39 is shown. A thin upper portion or coating of the bus bar material overlies the upper end or edge 46 of the lug, which upper end is narrowed by the notch 45, and the bus bar material occupies the notches 45 in each of the plates but does not project beyond the vertical edge 47. The same is, of course, true for the positive plates. The notches 45 enable me to obtain a horizontal grip between the material of the bus bar and the lug without the necessity of running the bus bar outward beyond the edge 47, thus effecting a saving of material necessary for casting the bus bar. As stated the bus bar includes an inner, transversely extending portion 48 inside the upper ends of the lugs, and it is the shrinking of the cooling material, after the bus bar is cast, and of the portions 48 and portions filling the notches 46 which causes the gripping effect between bus bar and lugs for maximum mechanical strength. As will be pointed out hereinafter my invention further contemplates a modification of this bus bar-to-lug union which will have the effect of saving even a further proportion of the metal necessary for the bus bar, but since the mold sections of the fixture itself are shown as properly shaped for the casting of the assembly shown in Figs. 1—5 the description of this modification will be deferred. It might be noted, however, that so far as current carrying capacity is concerned the bus bar need be no wider than the lugs themselves and it is largely for mechanical reasons alone that the bus bars have been made wider than these lugs prior hereto, and the notching of the lugs as seen at 45 thus far described at least overcomes the necessity for projecting bus bar material at one side as will be apparent.

Figure 8:
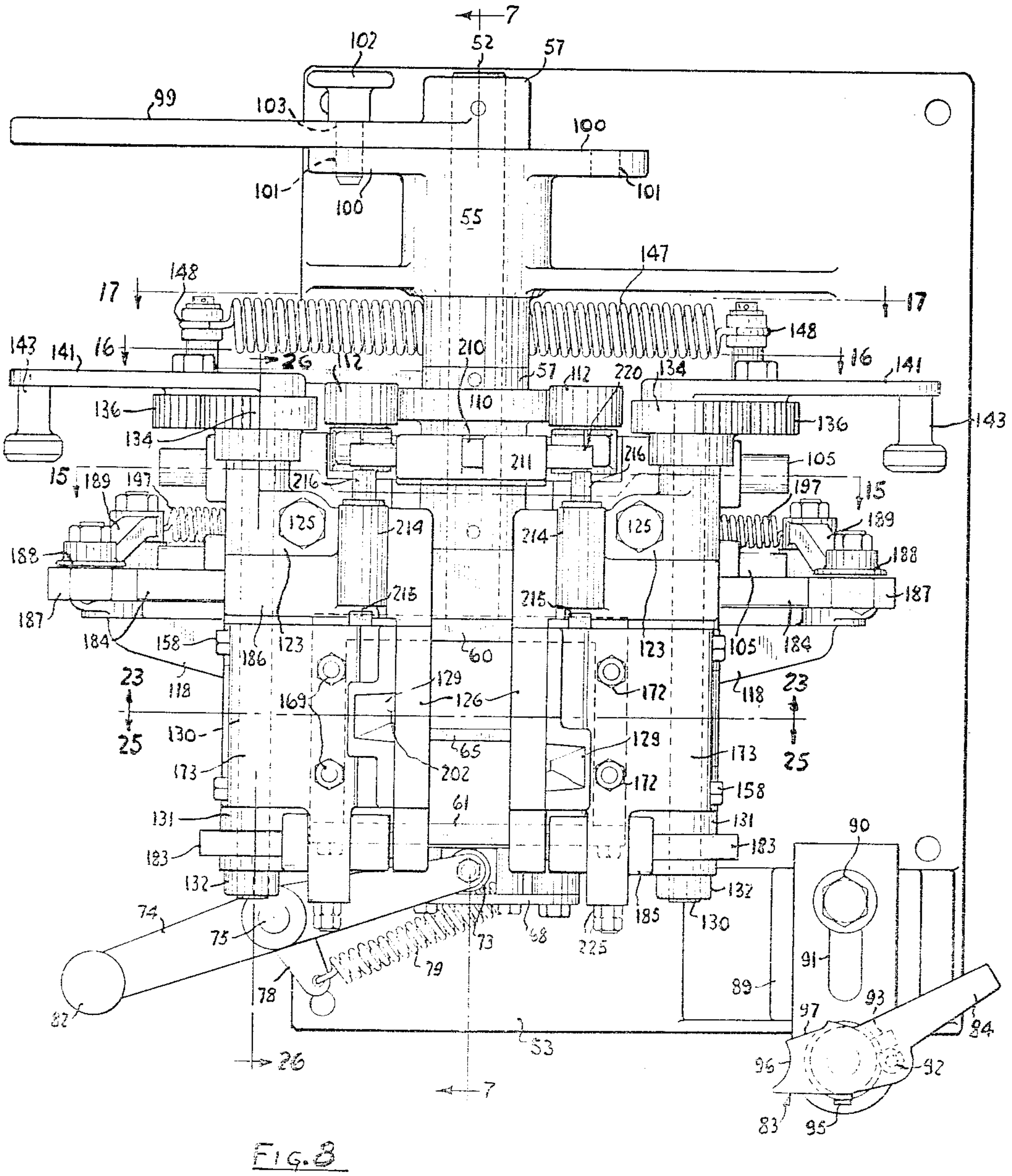
Fig. 8 is a top plan view of the fixture shown in Fig. 6.
Figure 9:
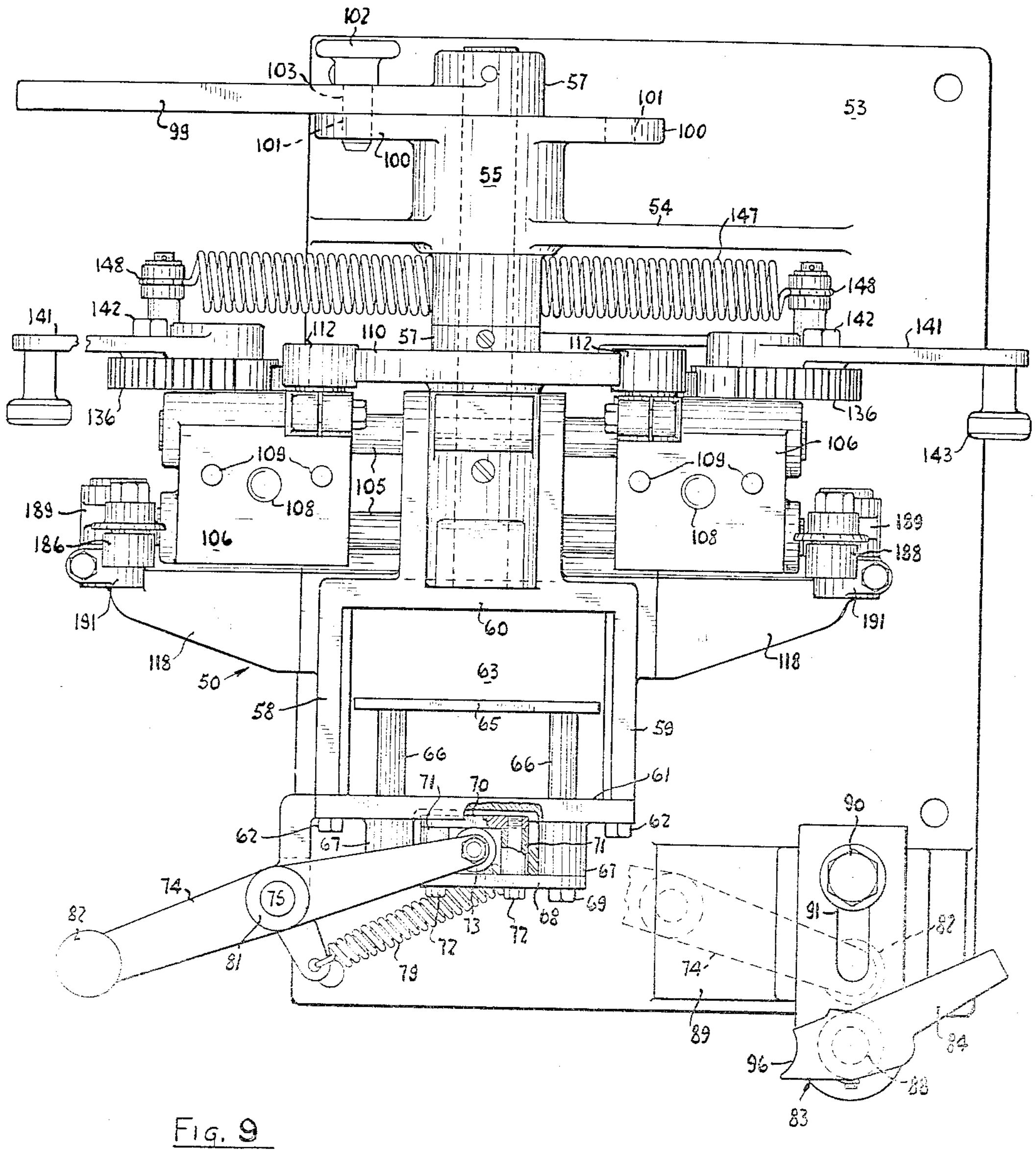
Fig. 9 is a similar top plan view but in this case with the casting mold assembly completely removed and certain parts shown in section to better disclose some of the details hidden in the showing of Fig. 8.

Turning now to a description of the grouping and casting fixture per se, the same will be described with reference to top and bottom with the fixture in its casting position shown in Fig. 6 (and others following) and with the molds themselves at the top of the structure. The fixture comprises a main frame, designated generally at 50, in the form of a suitable casting and at one end this frame has a bore, appearing at 51 in Fig. 7, for the reception of a main supporting rock shaft 52. The frame 50 is supported by this rock shaft a substantial distance above a base plate 53, here shown as rectangular in form and acting as a convenient means for mounting the fixture upon a work table or other support. Where the fixture is arranged for automatic operation, this base plate no doubt would be a part of the operating turret, but as here shown it mounts an upright standard 54 carrying a bearing 55 in its upper end, in and through which the rock shaft 52 is rotatably mounted. The frame 50 is secured to the rock shaft 52 by a set screw 56 appearing in Fig. 7, and similarly secured to the rock shaft at opposite sides of the bearing 55 are collars 57 which prevent endwise displacement of the shaft. It will be noted that the mounting part of the frame 50 is so located on the rock shaft 52 as to leave a substantial space between the adjaecnt collar 57 and facing end of the frame whereon may be loosely, rotatably mounted an actuating cam in a manner presently to be described. The frame 50 forms the group holder and for this purpose takes the form of an open ended U-shaped construction comprising opposed end walls 58 and 59 joined by an integral end wall 60, as best seen in Figs. 8 and 9. The end walls 58 and 59 are then joined by a cross bar 61 held in place by cap screws 62, so that there is formed a rectangular holder 63 for the accommodation of a group or pack of battery plates and separators, such as that shown in Figs. 1—5. The end walls 58 and 59 are so spaced as to nicely, loosely accommodate the end-to-end dimension of the group, and the facing surfaces of these end walls are divergingly tapered, as designated at 64, to facilitate the loading of the group, also as will presently appear. The dimension of the group holder 63 between the side walls 60 and cross bar 61, on the other hand, is much larger than the maximum overall width of the largest group of plates to be assembled, and the actual clamping effect upon the group takes place between the side wall 60 and a clamp plate 65 movably associated with the cross bar 61 for travel toward and away from the side wall 60.

Figures 10, 11, 12, 13, 14:
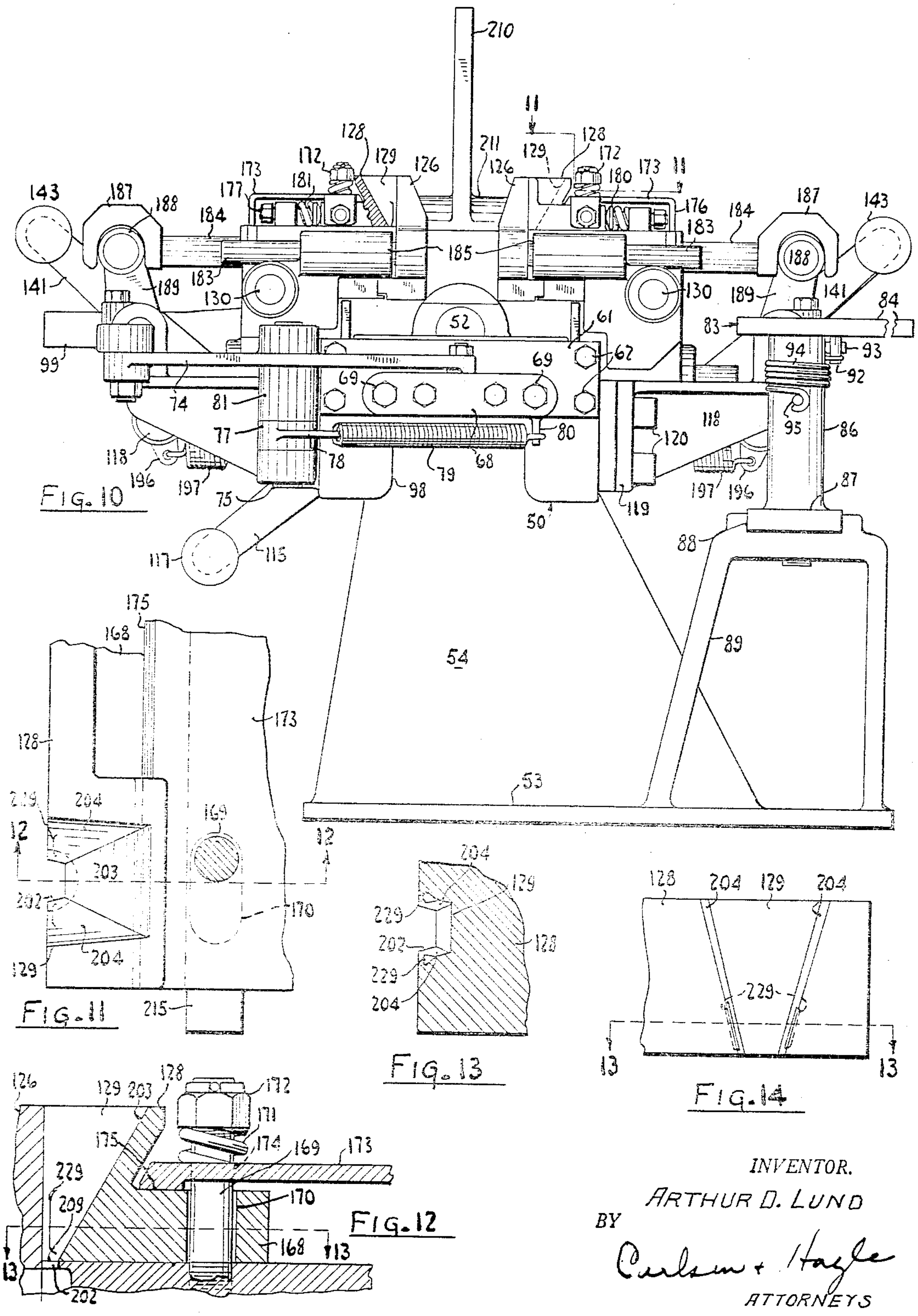
Fig. 10 is an end view of the fixture shown in Fig. 6, again with the fixture in its working or casting position and with a section of the casting mold assembly in section.
Fig. 11 is an enlarged fragmentary plan view taken substantially along the line 11—11 in Fig. 10 and particularly illustrating the shear gate and pouring opening through which the molten lead is introduced for casting the post and bus bar, and with the stud by which this gate is held shown in horizontal section.
Fig. 12 is a fragmentary vertical section along the line 12—12 in Fig. 11.
Fig. 13 is a fragmentary horizontal section substantially along the lines 13—13 in both Figs. 12 and 14.
Fig. 14 is an elevational view of the face of the gate.

For this purpose the clamp plate 65 is mounted upon spaced and parallel carrier pins 66, slidably mounted through apertured bosses 67 horizontally spaced apart upon the cross bar 61. Outwardly of the bosses 67 the pins 66 are connected by a tie bar 68, held in place by cap screw 69, and between the bosses there is secured to the tie bar 68, in spaced relation thereto, a shorter actuating bar 70 mounted by spacers 71 and cap screws 72. Space is thus provided between the bars 68 and 70 for an actuating roller 73 carried at the end of a clamp actuating lever 74 fulcrumed at 75. The cross bar 61 is recessed at 61a to clear bar 70 as seen in Fig. 9. The fulcrum 75 is a vertical pin carried in a bracket portion 76 of one end of the cross bar 61, and as seen in Fig. 10 there is also secured to this pin 75 a hub 77 having a radial finger 78 to which is connected a retractile coil spring 79. The opposite end of the spring 79 is attached to a lug 80 projecting from the cross bar 61 and tension of the spring is thus effective to rotate the fulcrum pin 75 in a clockwise direction, as viewed in Figs. 20—22. The lever 74 also has a hub 81 secured to the pin 75 and the tension of the spring 79 is thus effective to normally swing the lever in a direction such as to urge the roller 73 against the actuating bar 70 and thereby yieldably project the clamp plate 65 toward the side wall 60. It is the tension of this spring 79, acting upon the clamp plate 65, which is utilized to clamp the accumulated group of battery plates and separators and hold them while the posts and bus bars are being cast, but the group, when initially dropped into the holder, is relieved of the pressure of the spring by a manually positionable cam, the construction and operation of which will now be described.

Figures 20, 21, 22:
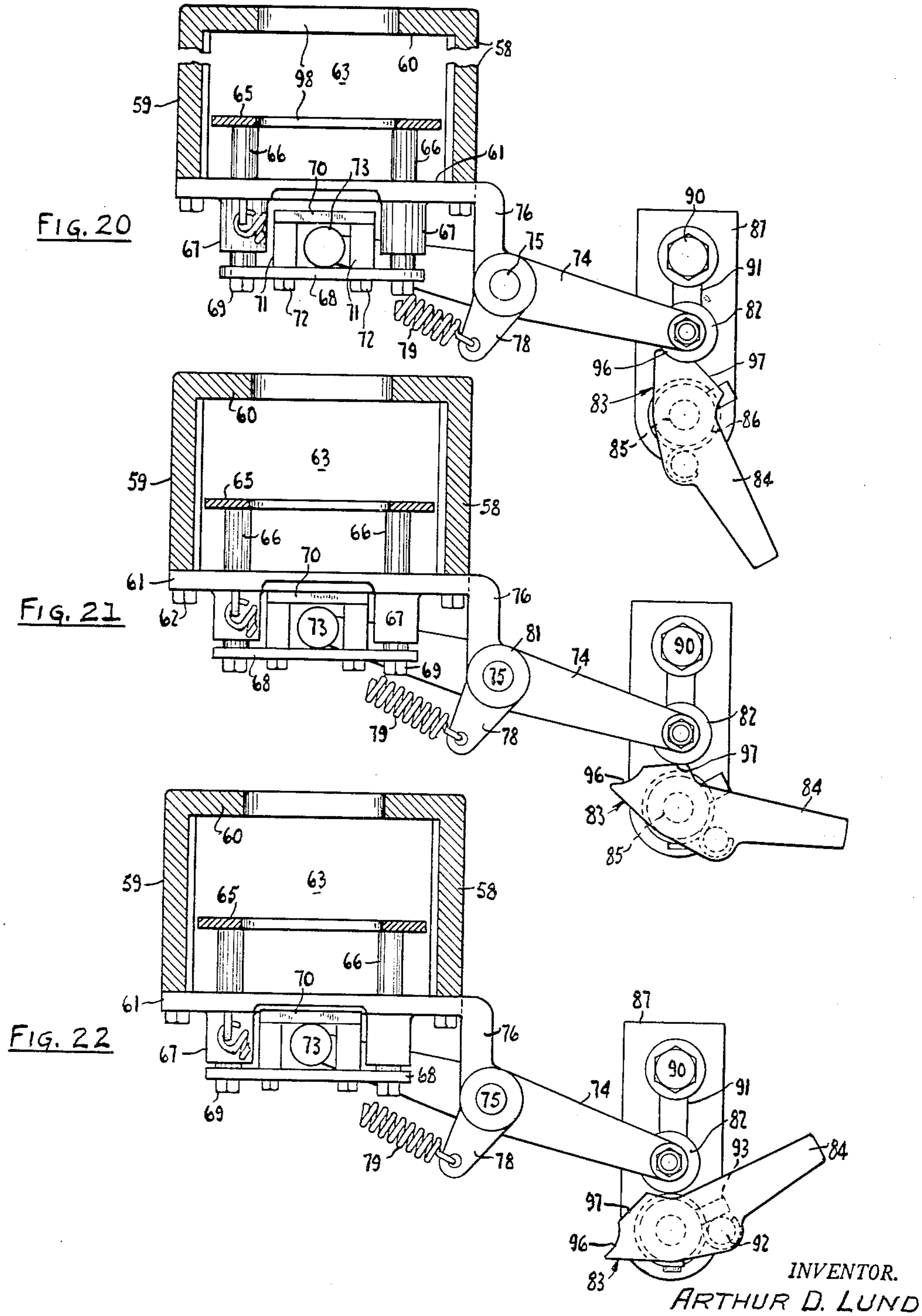
Figs. 20 through 22 are horizontal cross sectional views through that portion of the fixture constituting the group or pack holder per se, and showing the movable clamping plate portion thereof in three distinct positions regulated by the adjustment of a manually positionable cam.
Figure 23:
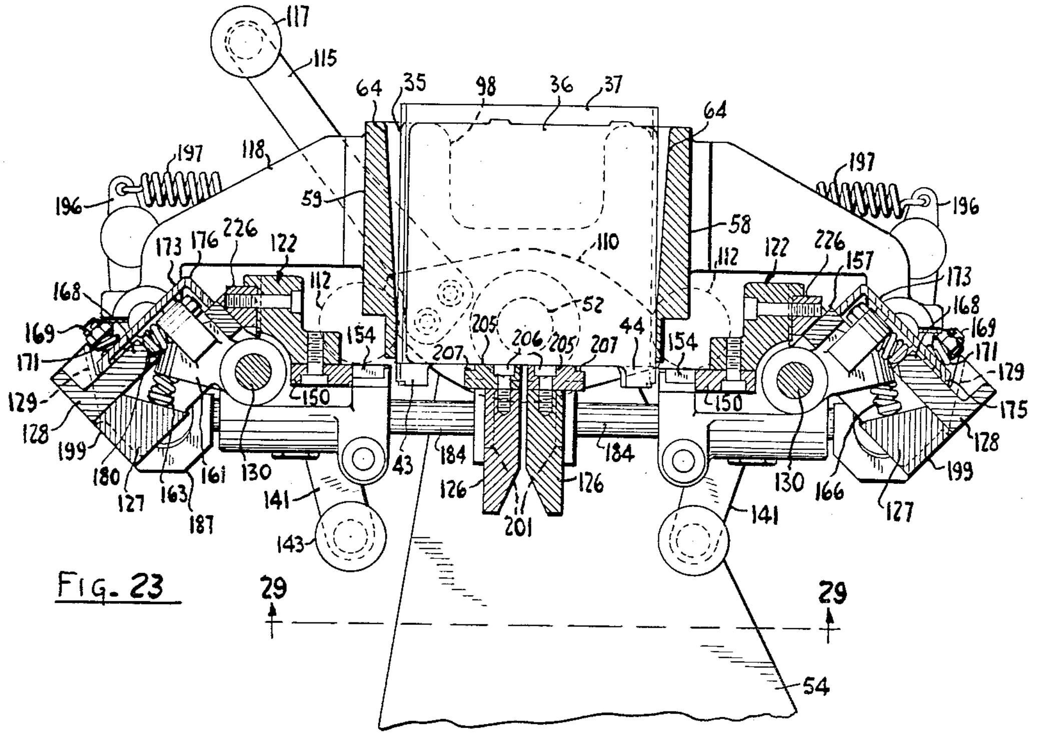
Fig. 23 is a vertical cross sectional view through the upper portion of the fixture taken substantially along the line 23—23 in Fig. 8, but with the fixture in its inverted or loading position, and showing a comparatively haphazard accumulation or group of plates and separators as loaded thereinto.
Figure 24:
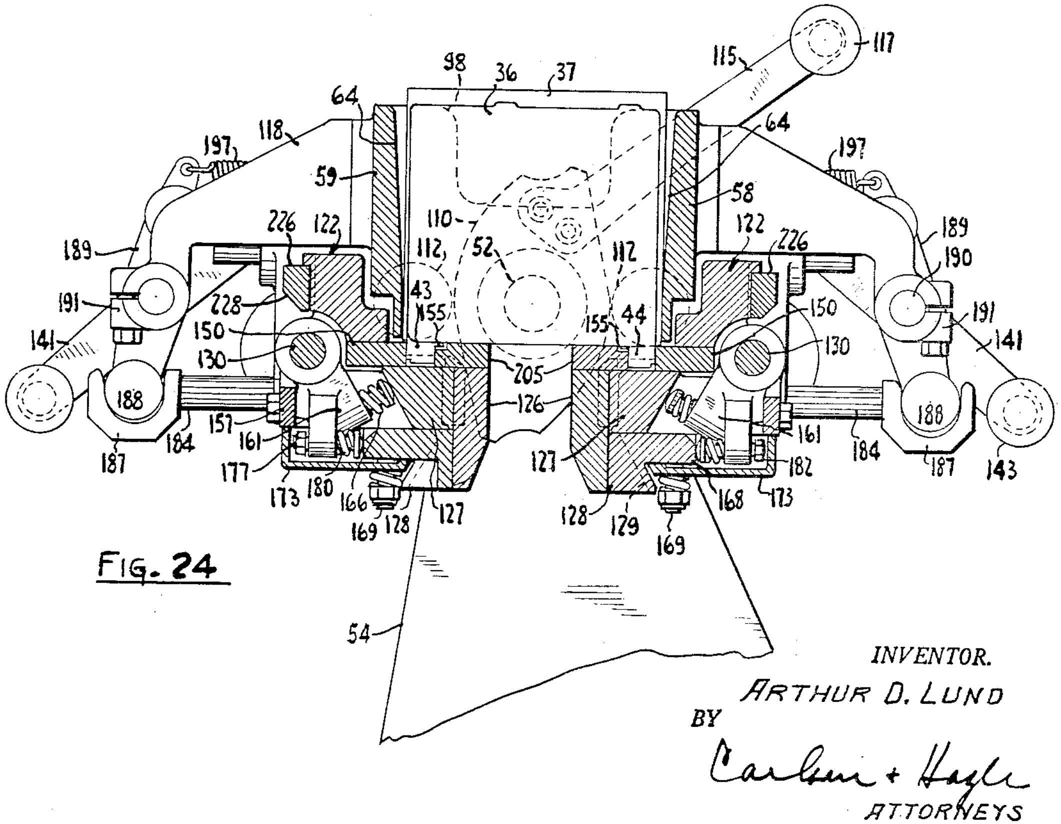
Fig. 24 is a similar view but showing the movable parts of the fixture as closed and ready to turn over the fixture for the casting operation, this view also illustrating the manner in which the plates and separators are brought into perfect alignment.

For this description attention is directed particularly to Figs. 9 and 20 through 22 wherein it will be seen that the actuating lever 74 is also provided with a roller 82 at what may be described as its outer end, or the end opposite that carrying the actuating roller 73. When the fixture is positioned in its inverted loading position, in which it appears in Figs. 20 through 22, this roller 82 swings into juxtaposition with the aforesaid manually positionable cam, designated generally at 83. This cam includes a hand lever 84 and is secured atop a vertical pivot pin 85, oscillatably mounted in a bearing 86, extending rigidly upward from a slide 87. The latter is slidably mounted in guides or ways 88 in a bracket 89 secured to the aforesaid base plate 53, and the slide is adjustably held in place by a cap screw 90 passing downward through a slot 91 in the slide and threaded into the bracket. It will be evident that this mounting permits the endwise adjustment of the slide 87, and of the cam 83 carried thereby, in a horizontal plane, parallel with the direction of movement of the clamp plate 65. The normal position of the cam 83 is that illustrated in Fig. 22 wherein a depending stop pin 92 on the hand lever 84 is in contact with a stop lug 93 projecting radially from the bearing 86. The cam is yieldably held in such position by a torsional coil spring 94 coiled around the bearing 86 and attached at one end to the pin 92 and at the other end to a pin 95 on the bearing, as best shown in Fig. 10. The tension of this spring 94 is such, however, that the cam 83 may be moved from its normal position of Fig. 22 against the tension of the spring to either of the positions shown in Figs. 20 and 21. The cam is adapted to cooperate with the roller 82 to adjust the actuating lever 74 and in the loading position of the fixture, ready for placing the group in the holder 83, the cam is located as shown in Fig. 20, with the cam surface 96 in engagement with the roller. This surface 96 is furthest removed from the center of the pin 85 and therefore tends to swing the lever 74 against the tension of the spring 79, causing the roller 73 to engage the cross bar 68 and pull the clamp plate 65 to the maximum spread distance away from the side walls 60. The distance between the plate 65 and wall 60 in this loading position will be determined by the adjustment of the slide 87, which positions the cam 83 with reference to the fixture as a whole, and will be selected according to the thickness of the individual battery plates and the number thereof in the groups being assembled. This is the purpose of the adjustment of slide 87 and makes it possible to select this open position of the pack holder for groups of differing, overall widths. Continuing the description of this phase of the machine it will be noted that the cam 83 is also positionable as shown in Fig. 21, in which position the cam surface 97 is brought into engagement with the roller 82. This surface 97 is relatively closer to the center of the pin 85 than is the aforesaid surface 96, and thus when the cam is swung to this position the lever 74 will be moved by its spring 79 in such direction as to move the clamp plate 65 toward the wall 60 a short distance. As will be described in greater detail hereinafter this movement of the clamp plate 65 is sufficient to bring light pressure to bear upon the group, while still leaving the individual plates and separators free for slight adjustments to bring them into proper alignment. In this position, however, the cam 83 retains its control over the position of the clamp plate 65 and final clamping pressure upon the group is brought to bear by swinging the cam to the position of Fig. 22, at which it clears the roller 82 and the spring 79 is free to move the clamp plate tightly against the pack. It will be noted that in these and other views of the drawing that the clamp plate 65 and wall 60 are cut away at 98 in order to facilitate loading and unloading of the group and allow clearance for the hand by which the group is inserted in the machine.

The frame 50 is swung to and between two positions, 180 degrees apart, for loading and casting and then unloading, and it is for this purpose that the frame is carried by the rock shaft 52. While I contemplate that this motion may be imparted to the frame automatically, I here show the rock shaft as provided with a positioning hand lever 99, radially extending from the collar 57 at the outer end of the shaft. In order then to hold the frame in either of its two positions, the bearing 55 is provided with oppositely, horizontally extending ears 100, apertured at 101 to receive a lock pin 102 located through an opening 103 in the hand lever. In making the adjustment of the fixture the operator simply removes the pin 102, swings the hand lever 99 over to the opposite position and then reinserts the lock pin through the openings 103—101, as will be readily understood. For the reason that the just described actuating lever 74 for the pack clamping mechanism projects laterally from the fixture, the bracket upon which the cam 83 is adjustably mounted is located at one corner of the base plate 53 while the bearing structure 55, on which the fixture is rocked, is located at the diagonally opposite corner. Thus as the fixture is swung from its casting position shown in Fig. 8 over to its inverted loading or unloading position, the roller 82 will come into proper position for actuation by the cam 83.

Figure 7:
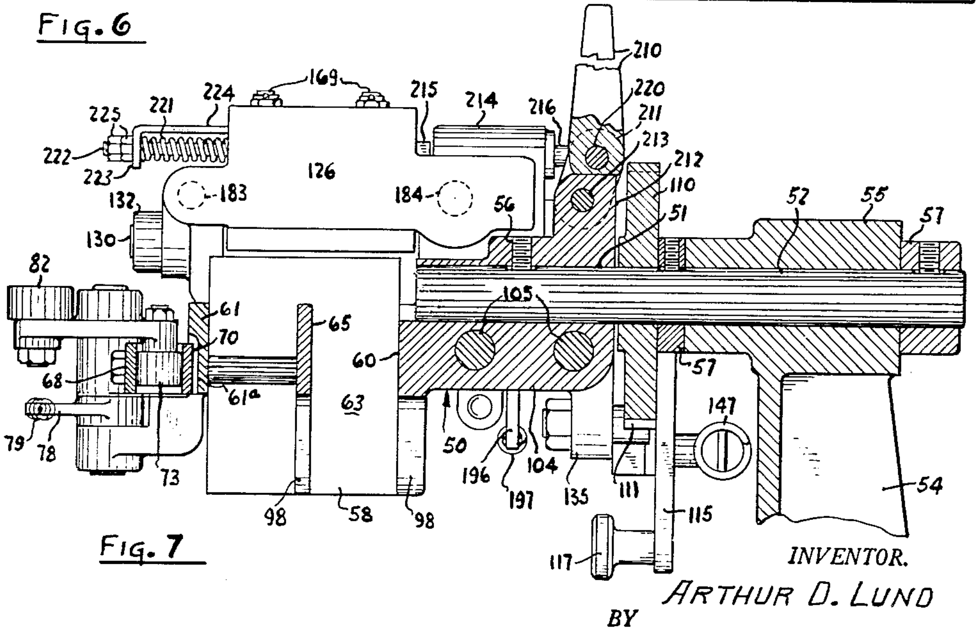
Fig. 7 is a longitudinal, central and vertical sectional view through the fixture in the position of Fig. 6, taken substantially on the line 7—7 in Fig. 8, with the battery plate group omitted and with only the upper portion of the fixture itself shown.
Figures 16, 17:
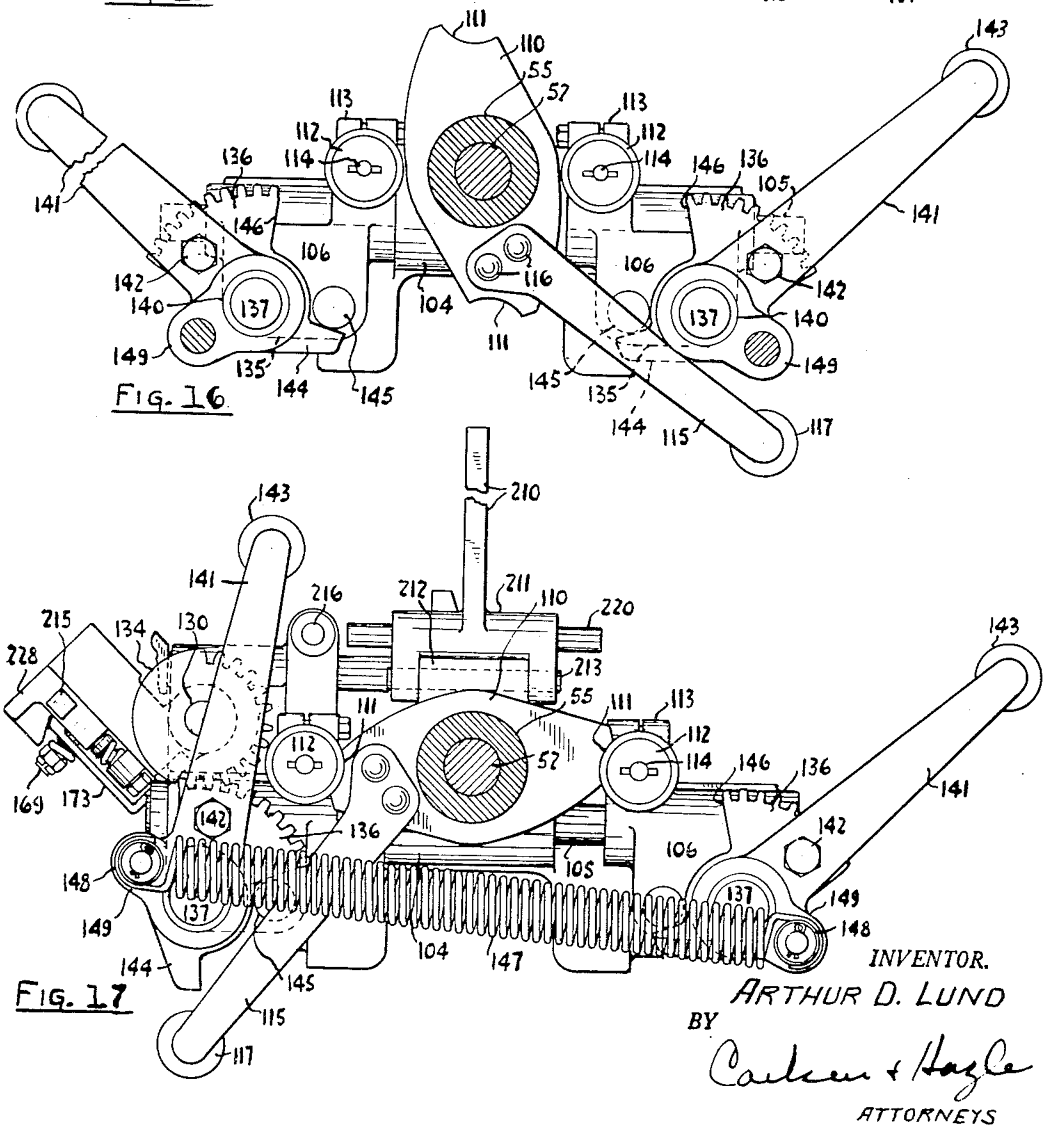
Fig. 16 is a similar view along the line 16—16 in Fig. 8 showing the actuating mechanism for the movable post molds in the position corresponding to that of Fig. 15.
Fig. 17 is a vertical cross section along the line 17—17 in Fig. 8 showing one of the swingably mounted bus bar and post molds in its open position and with the corresponding structure at the opposite side of the machine omitted.

Turning now to a description of the post and bus bar casting elements of the fixture, it will first of all be noted that the frame 50 has a portion 104 which is located beneath the rock shaft 52 in the casting position as seen in Fig. 7, and this portion of the frame firmly mounts a pair of transversely extending, parallel slide rods 105. As best shown in Figs. 8 and 9 these slide rods 105 project a considerable distance to each side of the frame 50 and they serve as mounts for mold carrier blocks 106, having apertures 107 slidably accommodating the ends of the rods. The upper surfaces of the carrier blocks 106 are faced off smoothly and serve as mounts for the detachable sections of the molds as will presently appear, these upper surfaces having tapped openings 108 flanked by pilot pins 109 by means of which the mold sections are secured and held in alignment. In the open position of the molds these carrier blocks 106 are moved apart to the position shown in Fig. 9, while in the closed position of the mold the blocks are pulled inward to the position shown in Fig. 8. As will presently be described the carrier blocks 106 are normally biased toward these inner positions of Fig. 8, and for adjusting the blocks I provide a cam 110 which is loosely mounted upon the rock shaft 52 between the collar 57 and adjacent end of the frame 50, in the space provided for its accommodation as previously set forth. The elongated shape of this cam is best illustrated in Figs. 16 and 17, wherein it will be noted that it has oppositely projecting ends, arcuated at their extremities 111, to cooperate with rollers 112 which are carried on adjacent corner portions of the blocks 106. For mounting the rollers 112 the blocks 106 are provided with upwardly projecting split collars 113, which are adapted to be drawn tight upon the pins 114 on which the rollers turn. A handle 115 is secured at 116 to one end of the cam 110 and at its end remote from the cam has a knob 117, the arrangement being thus such that the cam may be turned on the shaft 52 from the normal position of Fig. 16, at which the rollers 112 clear the cam, to the position of Fig. 17 at which the cam, by action of its oppositely projecting ends against the rollers, forces these rollers and, of course, the blocks 106 apart until the surfaces 111 come to rest against inner surfaces of the rollers. When the cam reaches the latter position it will remain in place due to the inward bias upon the blocks 106 and until the hand lever 115 is again grasped and returned to the position of Fig. 16. Also in this position of the cam 110 it will be so engaged with the rollers 112 that it will turn as a unit, with the fixture, about the rock shaft 52 as the fixture is swung between loading, casting and unloading positions.

Figure 6:
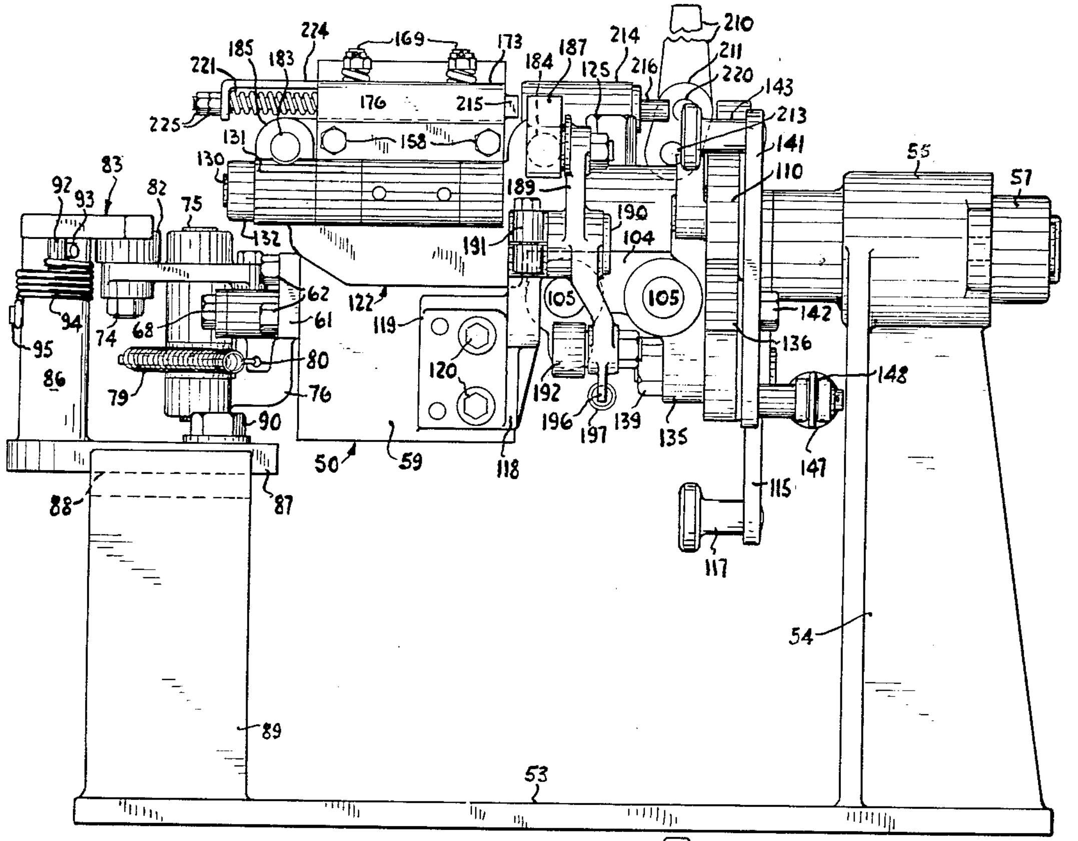
Fig. 6 is a side elevational view of the fixture constituting my invention and in which the battery group assembly of Figs. 1–5 is formed. This view is, however, at a smaller scale and the fixture is shown as in its casting or working position.

Also forming part of the mold supporting assembly is a pair of side brackets 118 mounted on the sides 58—59 of the group holder, for which purpose these brackets have base flanges 119 to be bolted in place as indicated at 120 in Fig. 6. From these flanges the brackets 118 project out laterally in opposite directions to points outward of the extremities of the slide rods 105 and the adjacent faces of the brackets are recessed out, as indicated at 121 in Fig. 26, to provide clearance for the movement of the carrier blocks 106. These portions of the mold mechanism remain in place upon the fixture when the molds per se are changed.

Figure 26:
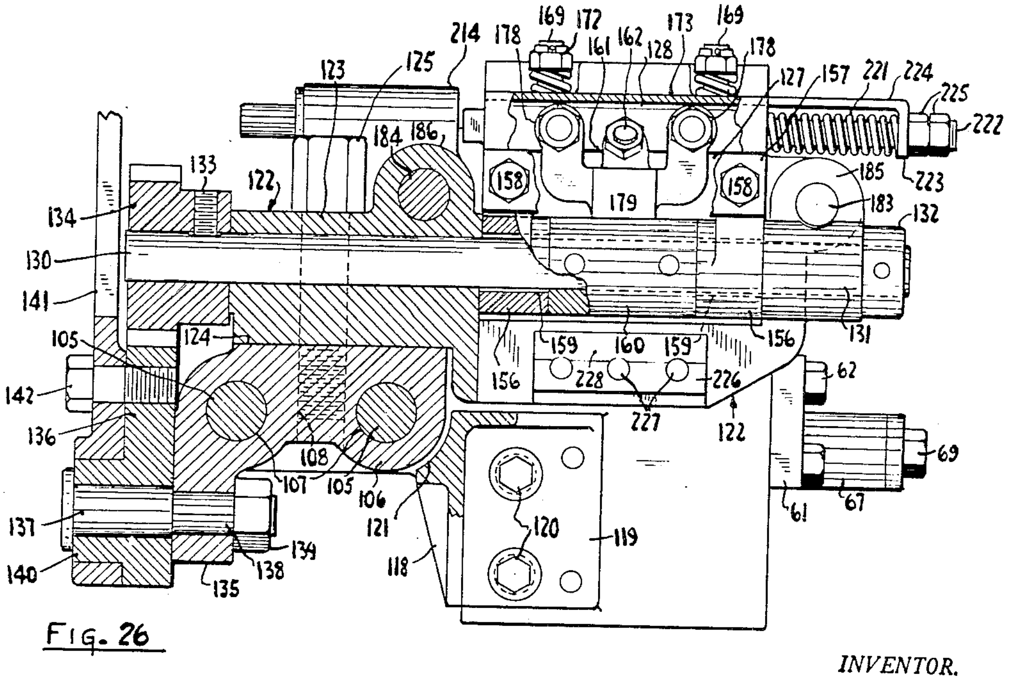
Fig. 26 is a side elevation partially in longitudinal section taken substantially along the line 26—26 in Fig. 8 with upper outer portions of the mold assembly broken away to disclose interior details of construction.

For casting each of the posts 40—41 and associated bus bar I provide a separate mold assembly positioned at the corresponding side of the pack holder, and while these assemblies are entirely separate and distinct from each other, they are similar and operate in unison, and the corresponding parts of each will accordingly be referred to by corresponding reference numerals. Basically each mold assembly comprises a base section, designated generally at 122, in the form of a properly shaped and machined casting, forming part of which is an end tang portion 123 (Fig. 26) faced off on its lower edge 124 (Fig. 26) to seat upon the upper surface of the corresponding carrier block 106. This tang portion of the mold assembly is held in place by a heavy cap screw 125 turned down into the aforesaid tapped opening 108, and the underside of the tang portion 123 is, of course, provided with openings (not shown) to register with the pilot or dowel pins 109 in order to hold the mold sections is proper alignment. From this tang portion the base section of the mold assembly projects laterally alongside the pack holder in order to support the casting components which include, for each mold assembly, an inner, movable post mold section 126 and an outer bus bar and post mold section 127, superimposed upon the latter of which is a shear gate 128 in which is a pouring gate 129 for the reception of the molten casting material. Alongside this assembly of the mold components the base member 122 carries a rotatably mounted spindle 130, extending through the mounting tang portion 123 and through an apertured ear 131 spaced therefrom at the opposite end of the pack holder as seen in Fig. 26. A collar 132 is pinned to one end of the spindle 130 and secured upon the opposite end thereof, by means of a set screw 133 (Fig. 26) is a pinion 134 having spur gear teeth around a part of its periphery. The pinion 134 is located at the extremity of the tang end 123 of the base section 122 and the corresponding side of the carrier blocks 106 has a downwardly extending, apertured lug 135 (Figs. 6 and 26) for mounting a cooperating gear sector 136. For this purpose a headed pin 137 (Fig. 26) is journaled through the sector 136 and has its reduced end 138 extended through the lug 135 and held by means of a nut 139. The sector 136 also has a hub 140 and fitted on this hub is an actuating lever 141 secured to the sector by means of a cap screw 142, so that movement of the lever 141 by its knob 143 will rock the gear sector, and since this sector meshes with the aforesaid pinion 134 a corresponding but opposite oscillation is imparted to the spindle 130. For each mold assembly the associated hand lever 141 has two positions corresponding to open and closed positions of the molds and which appear in Figs. 16 and 17. In Fig. 16 it will be noted that the levers 141 are spread apart at their knobbed ends, and in this position they are stopped by engagement of projecting stop fingers 144, formed upon the sectors 136, and engaging stop studs 145, secured in the adjacent end faces of the carrier blocks 106. In the open position of the molds, as seen in Fig. 17, both of the levers 141 are swung together at their knobbed ends, although in this view only the lever and associated parts at the left-hand side are so shown. It will be clear, however, that the stop studs 145 will now cooperate with the adjacent end surfaces 146 of the gear sectors to limit the motion in this direction, as is clearly shown to the left in Fig. 17. The hand levers 141 and associated mold parts operated thereby are held in either of the just described positions by means of a retractile coil spring 147, extending across and beneath the rock shaft 52 to the opposite sides of the fixture and attached at its ends at 148 to lugs 149 projecting radially from the lower ends of the hand levers. These lugs 149 as so located with respect to the angles assumed by the levers 141 in their two positions that the ends of the springs will be brought beyond dead center positions with respect to the axes of the pins 137 in order to hold the hand levers against the stop studs 145 in either position, as is clearly illustrated in Fig. 17. It is this spring 147 which also biases the carrier blocks 146 in the inward direction as previously described, due to the fact that it exerts an inward pull upon parts directly connected to these blocks and thus, of course, tends to slide them inward on the carrier rods 105.

Figures 27, 28:
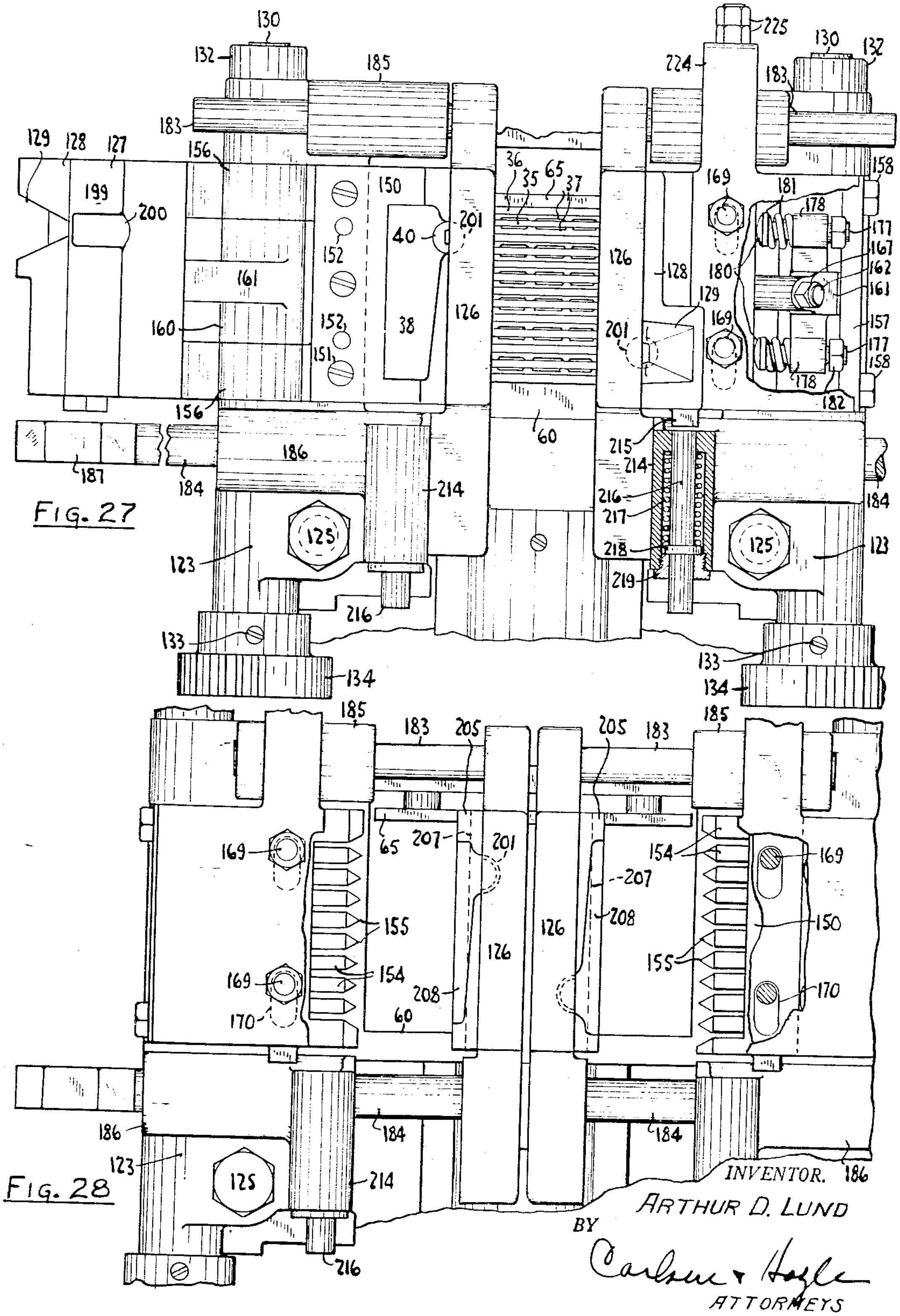
Figs. 27 and 28 are similar enlarged plan views partially in section through the casting portion of the fixture, illustrating certain structural features thereof and with several views further illustrating a number of steps or stages in the casting operation.
Figure 29:
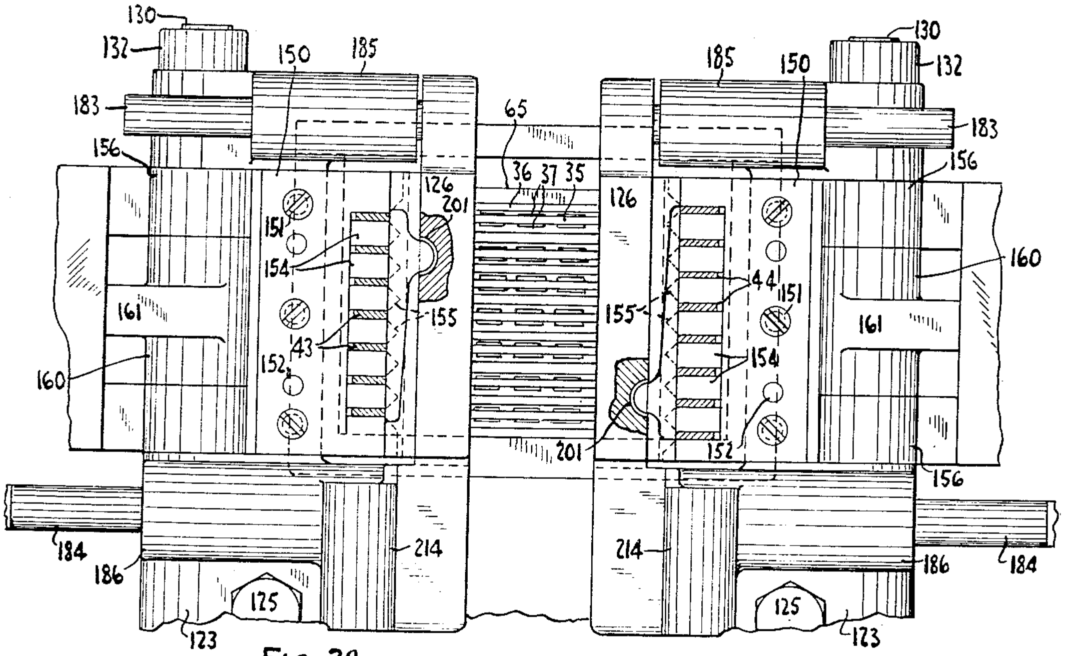
Figs. 29 and 30 are inverted plan views with certain elements in partial section and illustrating the action of the fixture in aligning and holding the group of plates ready for the casting operation. These views are taken approximately along the line 29—29 in Fig. 23 at a larger scale, and the plate lugs are sectioned to distinguish them from the remainder of the plates themselves.
Figure 30:
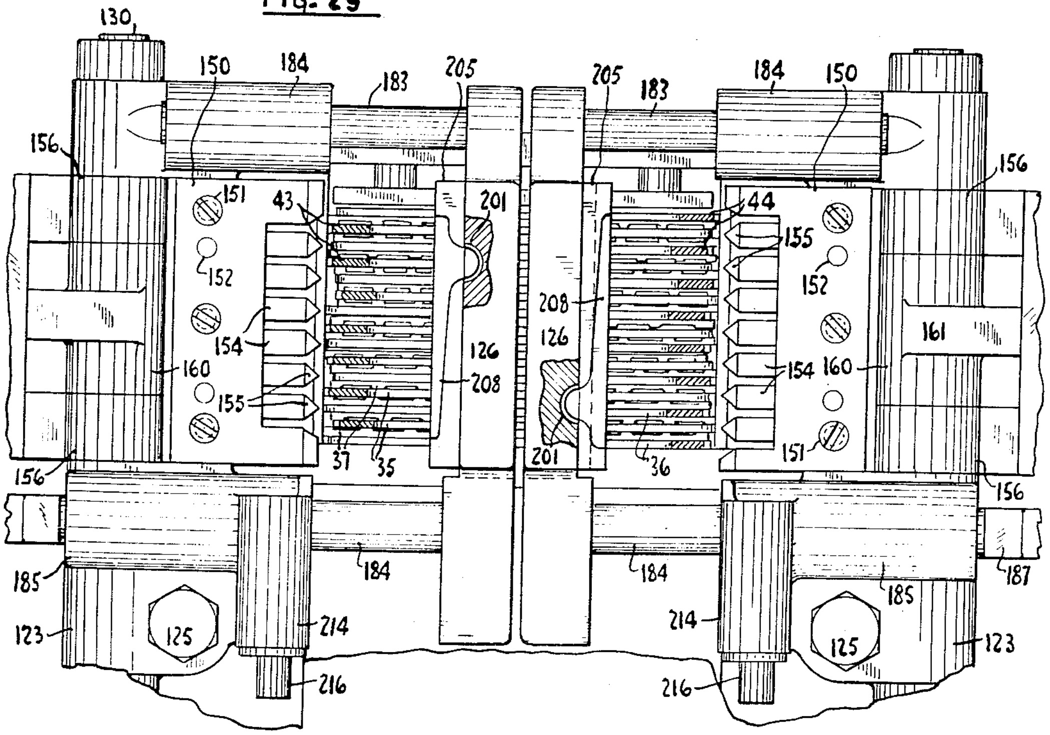

Each base member 122 of the two mold assemblies, where the same projects alongside the pack holder, is faced off on its upper edge to mount a comb plate 150, which is firmly secured thereon by means of cap screws 151 and is further accurately positioned by means of mating dowel pins and openings therefor, designated collectively at 152 and appearing in Fig. 27. Each comb plate projects inwardly over the adjacent upper edge of the group holder side 58 or 59, as the case may be, and inwardly of these sides the comb plates are provided with a series of inwardly projecting, spaced apart teeth 154, the vertical dimension of which is less than the thickness of the plates themselves so that the upper edges of these teeth are offset downwardly from the corresponding upper faces of the plates. At their inner extremities the teeth 154 are further reduced in vertical thickness and are provided with thin tapered points 155 flush with the lower edges of the plates. As will presently appear the comb teeth 154 are adapted to enter between the lugs 43 and 44 of the battery plates in order to accurately space the plates, and the pointed ends 155 obviously will facilitate the entrance of the teeth between the respective lugs. In addition to so spacing the lugs, the teeth 154 define a part of the bottom of the casting cavities wherein the bus bar connecting the lugs is cast, and this is the purpose of downwardly offsetting the upper edges of the teeth so as to provide vertical space for the accommodation of the bus bar material between the lugs.

The outer post and bus bar mold section 127 of each mold assembly fits slidably down upon the upper surface of the associated comb plate 150 and this mold section is attached to spaced, apertured sleeves 156 which loosely fit the spindle 130, these lugs being tied together by means of a cross bar 157, held in place by cap screws 158. The bores 159 of the sleeves 156 are considerably larger than the external diameter of the spindle 130 so that the mold section 127 is free for limited, sliding movement across the upper face of the comb plate 150 in an inward and outward direction. Securely pinned to the spindle 130 between the sleeves 156 is a collar 160 and at its center this collar has an upwardly and inwardly angled lug 161, through which there slidably projects a push pin 162 having a rounded head 163 which bears inwardly and downwardly on a sloping center surface 164 of the mold section 127. To form this surface 164 the central portion of the mold section 127 is cut away, as indicated at 165, and braced between the rounded head 163 of the pin 162 and the adjacent surface of the lug 161 is an expansion coil spring 166 the thrust of which, acting upon said head 163, tends to urge the mold section 127 both inwardly and downwardly. A stop nut 167 on the outer end of the pin 162 limits motion of the push pin through the lug and prevents disassembly of the parts in the open position of the mold, as made clear in the showing to the left in Fig. 25.

The shear gate 128 has a base portion 168 which fits slidably down against the upper surface of the mold section 127 and the parts are slidably held in such assembly by means of vertical studs 169 threaded into the upper part of mold section 127 and projecting upwardly through elongated slots 170 in the base portion of the shear gate. Expansion coil hold down springs 171 are braced between nuts 172 screwed on the upper ends of the studs 169 and a cover plate 173, the horizontal portion of which has openings 174 to pass the studs, as best seen in Fig. 12. Said horizontal portion of the cover plate 173 also has a depending rib 175 inward of the studs which bears downward on the base portion 168 of the shear gate, so that the down pressure of the springs 171 is brought to bear on the shear gate as far inwardly as possible bearing in mind the necessary configuration of the gate in order to provide the gate opening 129 through which the molten metal is poured. The cover plate 173 also has a vertical flange 176 which is held downward against the cross bar 157 by the pressure of the springs and this cover plate accordingly acts both to hold the shear gate tightly but slidably in the assembly and to protect interior parts of the mold assembly from falling material. The aforesaid slots 170 are so elongated as to permit reciprocation of the shear gate 128 crosswise of the battery plate group as will presently appear, and in addition these slots are substantially wider than the studs 169, as seen in Figs. 11 and 12, so that the shear gate may also slide inwardly and outwardly, as is the case of the mold section 127. The shear gate is biased in the inward direction by means of headed push pins 177, which are slidably mounted through the bifurcated ends 178 of a lug 179 forming part of the aforesaid collar 160, and here again the rounded heads 180 of these pins are thrust against the adjacent end of the shear gate base portion 168 by means of expansion coil springs 181 braced between said heads and the lug. The pins 177 are also provided with nuts 182 to limit their motion by the springs 181 and hold the parts in assembly in the open position of the mold.

Figure 15:
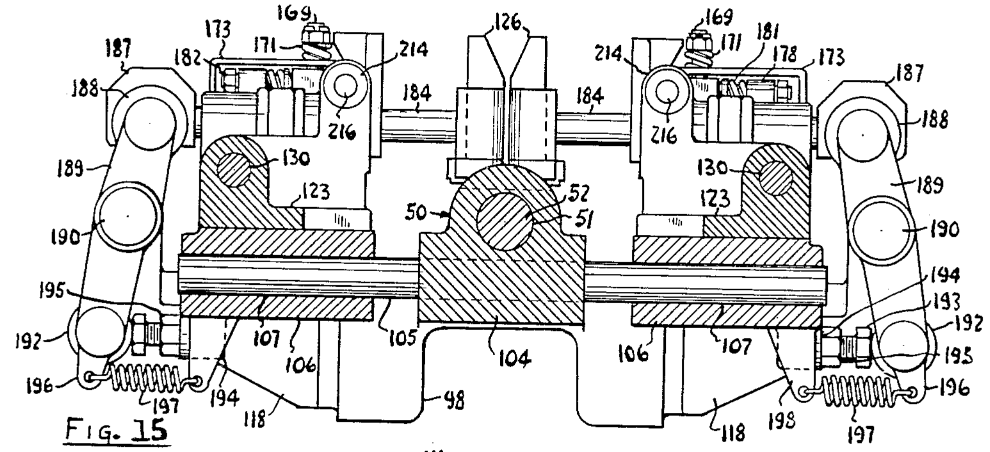
Fig. 15 is a vertical cross sectional view along the line 15—15 in Fig. 8 showing the movable post molds in their open position.
Figure 18:
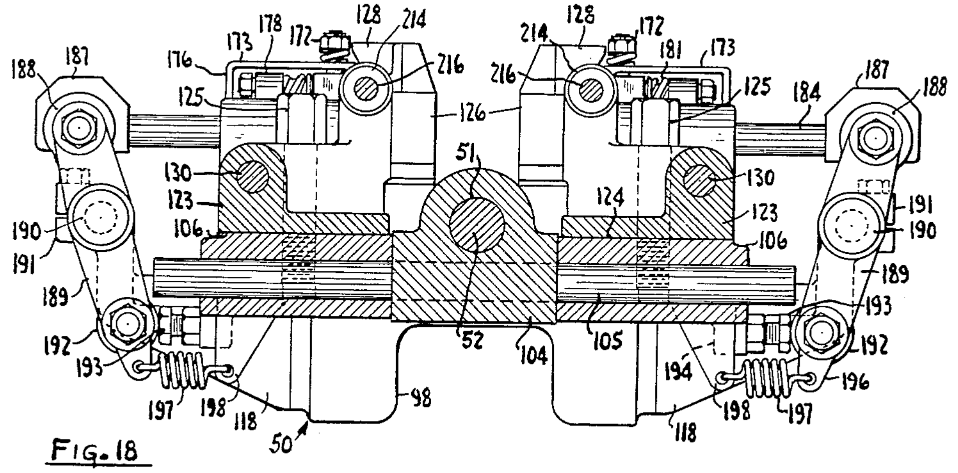
Fig. 18 is another vertical cross sectional view similar to that of Fig. 15, but with the movable post molds closed.
Figure 19:
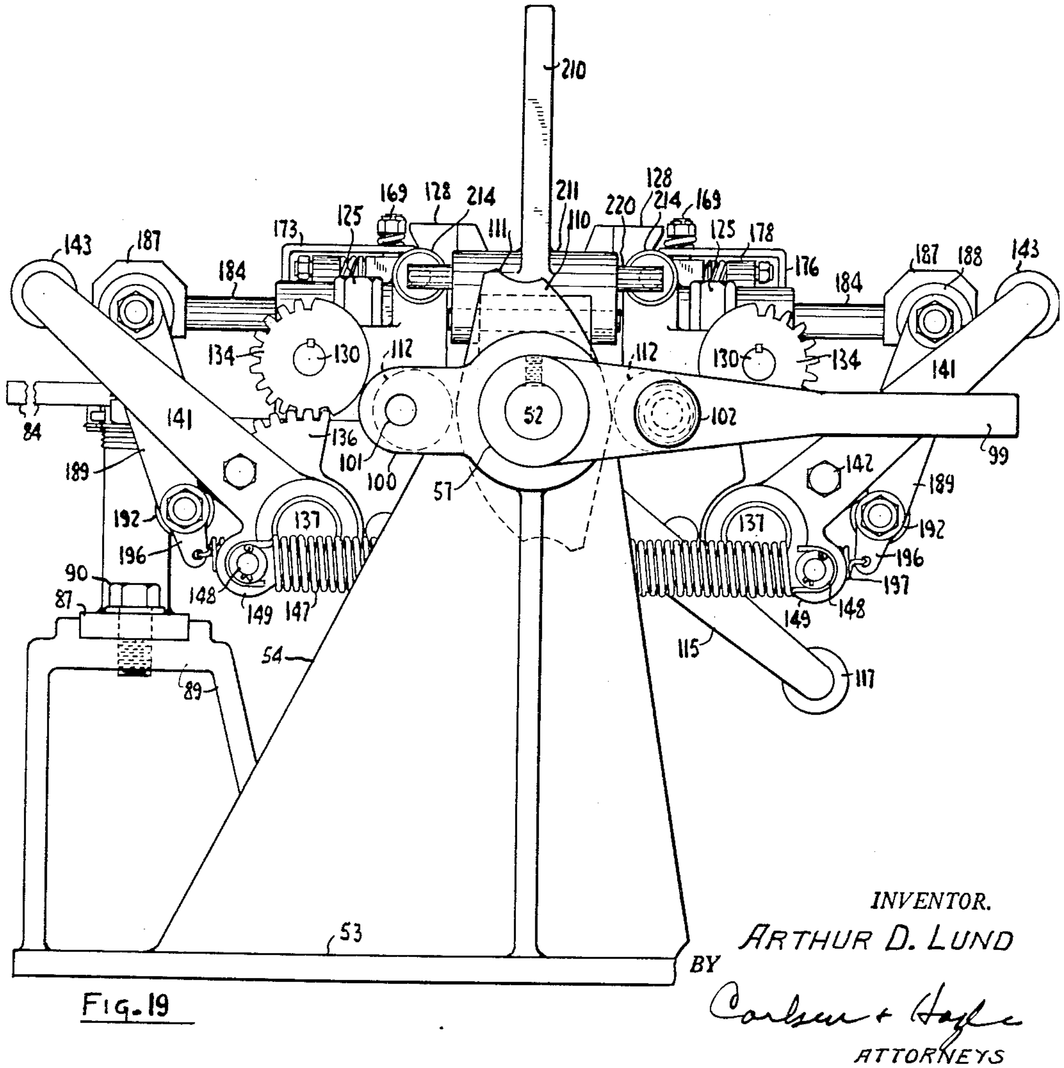
Fig. 19 is an end view of the entire fixture viewing the same from the end opposite to that shown in Fig. 10.

The inside movable post mold sections 126 are mounted adjacent their ends upon outwardly, oppositely projecting parallel carrier pins 183 and 184, which extend outwardly alongside the outer portions of the mold assembly and are slidably mounted through bored bosses 185 and 186 forming parts of the base members 122. The arrangement is such that these mold sections 126 may move inwardly toward each other, or outwardly and apart, as the carrier rods 183 and 184 are reciprocated in order thus to open and close these inner mold sections with respect to the outer sections of the mold. The carrier pins 183 merely pilot the inner mold sections 126 in such motions, but the other rods 184, which are longer and preferably larger in diameter, act as actuating rods for moving the mold sections for which purpose the outer ends of the rods 184 are provided with downwardly opening, inverted U-shaped yokes 187. These yokes fit downwardly over flanged rollers 188 journaled at the upper ends of rock levers or rockers 189, which are fulcrumed intermediate their ends upon pins 190 carried in split clamp collars 191 forming extensions of the aforesaid side brackets 118. At their lower ends the rockers 189 carry rollers 192 and adjustable actuator cap screws 193 bear against the inner peripheral surfaces of these rollers, as shown in Figs. 15 and 18. Said cap screws 193 are adjustably threaded in lugs 194 depending from the sliding mold carrier blocks 106, and lock nuts 195 are provided for locking the cap screws in any laterally out-thrust position with respect to said blocks. The said lower ends of the rockers 189 are also provided with depending apertured ears 196 and small retractile coil springs 197 are stretched between these ears and apertured lugs 198, depending from the blocks 196, in order to hold the rollers 192 against the actuating cap screws 193. The arrangement is thus obviously such that the outward movement of the carrier blocks 106, which occurs as the molds are opened, will correspondingly thrust the lower ends of the rockers 189 in the outward direction, causing them to swing about their pivots 190, carried by the pack holder, to thereby move the upper ends of the rockers in an inward direction. Such inward movement of the upper ends of the rockers causes the flanged rollers 189 thereon to move the yokes 187 and carrier rods 184 in an inward direction to slide the inner movable post mold sections 126 together almost into meeting relation, as seen in Fig. 15. The opposite inward movement of the carrier blocks 106, as the molds are closed, will result in an opposite motion of the rockers 189 such as to move the inner post mold sections 126 outward to closed position, as seen in Fig. 18, it being noted that the springs 197 cause the lower ends of the rockers 189 to follow along as the actuating cap screws 193 travel inward with carrier blocks 106 as is necessary to bring about this motion of the rockers and molds 126.

Figure 25:
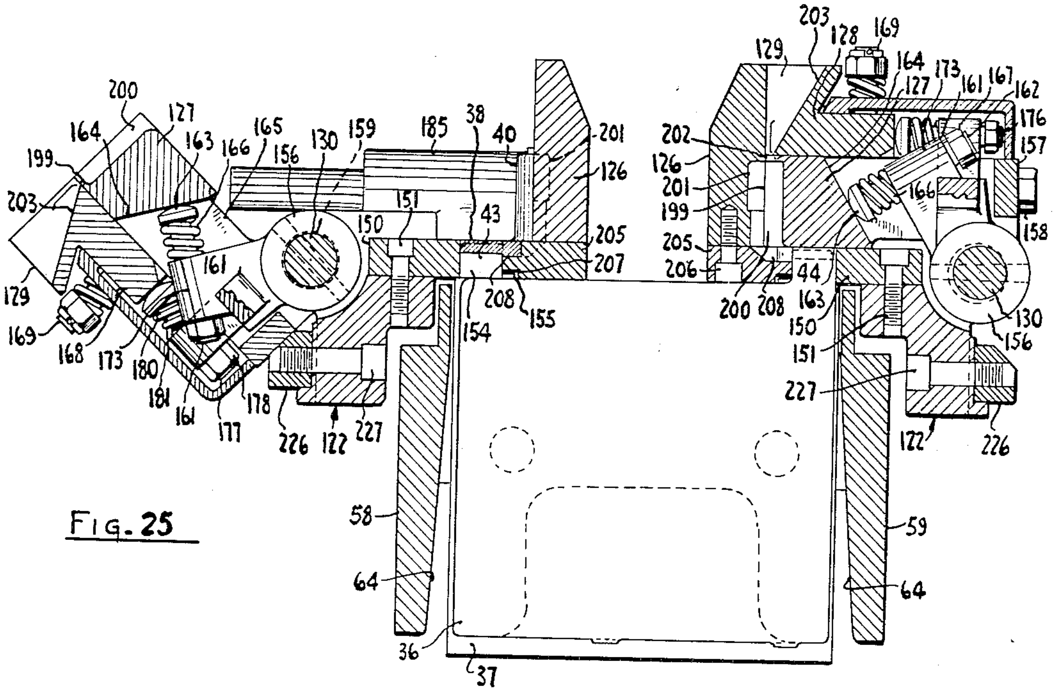
Fig. 25 is an enlarged vertical cross section through the upper portion of the fixture taken substantially along the line 25—25 in Fig. 8 and illustrating a stage in the casting operation wherein one of the movable mold sections has been swung away to expose the cast bus bar for the burning operation.

Referring now particularly to Figs. 25 and 27 it will be noted that each outer mold section 127, on the vertical face 199 against which the inner mold sections 126 close, is provided with a vertical, half-round cavity 200 located in the proper position for casting the outer portion of the terminal post 40 or 41, as the case may be. On the corresponding surface of the mold section 126 a similar, mating half-round cavity 201 is formed to cast the inner half of the terminal post, with this cavity slightly reduced in diameter over its lower half to provide the metal saving portions 40a or 41a of the posts, as clearly shown. These cooperating cavities 200–201 terminate short of the upper surface of mold sections 127 and communication is formed between the cavities and the gate 129 by means of a restricted opening 202 so shaped as to cast the polarity indicators 42 atop the posts. The outer face of each mold section 126 is vertical from top to bottom and the flare for the gate 129 is formed entirely in the shear gate 128 by an inclined wall 203. The opposite sides of the opening 129 connecting said wall 203 with the vertical face of the shear gate are also sloped as best shown at 204 in Figs. 11, 13 and 14. The inner movable post mold sections 126 also each have a bottom cavity plate 205 held in place by cap screws 206, and this plate is of the same vertical dimension as of the aforesaid comb plate 150. In the closed positions of the molds the outer edge of each cavity plate 205 meets the inner ends of the comb teeth 154 and the adjacent lower corner of the plate 205 is accordingly notched out at 207 in order to clear the pointed ends 155 of the teeth. Each plate 205 projects outward beneath the cavities 200–201 and the upper surface of the plate is provided with a bus bar casting recess 208 extending lengthwise of the plate a distance sufficient to cast the hereinbeforementioned inner portion 48 of the bus bar, with said cavity 208, of course, extending outward from beneath the cavities 200–201 to join the terminal post with the bus bar. The resulting shape of cavity 208 best appears in Fig. 28. It will also be noted, in Fig. 25, that each cavity 208 is slightly below the upper edges of the comb teeth 154, so that the vertical dimension of the bus bar portion 48 will be slightly greater than that portion of the bus bar cast between the plate lugs themselves, and the showing in Fig. 25 corresponds exactly, insofar as the shape of the casting cavities is concerned, with the hereinbefore described disclosure in Fig. 4.

The purpose of the spring bias placed upon the mold sections 127 and shear gates 128 is, of course, to cause these sections to close tightly against the inner movable post mold sections 126 so that the molten metal cannot flash between the molds. In addition, the downward bias placed upon the mold sections 127 by the inclination of the pins 162 and spring 166 cause these parts of the molds to fit tightly down upon the comb plates 150 and cavity plates 205 for the same purpose. As the casting cavities are filled with molten metal there will, of course, result a partial filling of the gate openings 129 for the respective mold assemblies, and it is necessary, therefore, to shear off this scrap or gate portion of the casting from the terminal post by a reciprocation of the shear gate 128, sufficient to shear the metal between openings 129 and 202 along the shear line designated at 209 in Fig. 12. For this purpose the shear gate 128 is reciprocated crosswise of the group, as permitted by the slots 170 which clear the studs 169 as previously described. This motion of the shear gate 128 is accomplished by a hand lever 210, extending upward from about the center of the fixture and forming part of an inverted U-shaped yoke 211, the downwardly extending ends of which are fitted alongside an upwardly projecting lug 212 on the frame 50 immediately alongside the cam 110. A pivot pin 213 fits through said lug 212 to pivotally mount yoke 211 and lever 210 for swinging movements in a plane parallel with the rock shaft 52, as will be understood from Figs. 6 and 7. The tang portion 123 of each mold base member is formed immediately above the bored bosses 186 with hollow sleeves 214 at right angles to said bosses, and in alignment with endwise projections or bumpers 215 formed on the adjacent ends of the respective shear gates 128. Slidable in said sleeves 214 are plungers 216 biased by means of expansion coil springs 217 to move outward from and clear of the bumpers 215. Such motion of the plungers 216 is limited by stop collars 218 thereon which bear on the inner ends of tubular ferrules 219 screwed in the sleeves 214, as seen to the right in Fig. 27. The plungers 216 project through said ferrules 219 into juxtaposition with the ends of a cross rod 220, secured through the yoke 211. Thus the arrangement is such that a pull on the hand lever 210 (in a downward direction as viewed in Fig. 8) in the direction of the group holder, will cause the ends of the cross rod 220 to strike the exposed ends of the plungers 216, driving them through the sleeves 214, against the tension of the springs 217, so that the plungers abut the bumpers 215 and thrust the shear gates 128 bodily in a corresponding direction. This motion is carried out to the point that the openings 129 and 202 are moved out of registry as necessary to shear the cast material along the line 209, and the slots 170 are, of course, of sufficient length for this purpose. After the scrap material is so sheared the handle 210 is released and the shear gates are returned to their normal position by means of expansion coil return springs 221, which are disposed around studs 222 screwed in and projecting endwise from the base portions 168 of the shear gates and appearing best in Fig. 26. Said springs 221 are braced between the adjacent ends of the shear gates and depending apertured flanges 223 formed at the extremities of extensions 224 of the horizontal portions of the cover plates 173. Said cover plates are, of course, held against corresponding motion with the shear gates by their mountings upon the studs 169, so that the springs 221 are effective to normally urge the shear gates to their working positions, and the return motion is limited by stop and lock nuts 225 on the studs 222 outward of the flanges 223 for properly registering the mold cavities. The clearance between the bumpers 215 and plungers 216 is necessary in order to permit the shear gate and associated mold section 127 to swing to their open positions as will be understood.

*Operation*

The operation of the fixture will now be described, and at the outset it will be assumed that the fixture has been placed in the loading-unloading position of Figs. 23, 24, 29 and 30 (corresponding also to the showing in Figs. 20–22) and there secured by the pin 102. As loading begins the combs 154—155 are also moved outward or apart, by positioning hand lever 115 in the position of Figs. 17 and 23 whereat cam 110 engages the rollers 112 and spreads the mold carriers 106 which, of course, carry the combs as previously described. Also when loading, the molds are opened and for this purpose the levers 141 are swung inward to the positions of Fig. 17 (at the left) and Fig. 23. This movement of levers 141 turns the sectors 136 and through them the gears 134 on the spindles 130 clockwise as viewed in Fig. 23 and the collars 160 pinned to these spindles swing the bus bar and outer post mold sections 127 and shear gates 128 outward bodily in an arc until the cross bars 157 strike bumper bars 226 which are secured by cap screws 227 to the base members 122 for the molds. The purpose of thus stopping the swinging portions of the molds against the bumper bars 226 will be presently made clear and it will be noted that these bumper bars have angularly faced corners 228 to squarely meet the cross bars 157 as the molds are stopped. The inner movable post mold sections 126 are also, of course, moved together to their opened positions (Figs. 15 and 23) by the outward movement of the mold carriers 106 which swings the rockers 189 by the engagement therewith of the actuating cap screws 193, causing the rollers 188 to push yokes 187 inward, sliding the carrier rods 184 to so position the mold sections. When opened the inner post mold sections 126 almost meet at the center of the pack holder 63 which they span, crosswise of the battery plates to be placed therein and the cavity plates 205 are exposed at the bottom of the pack holder in its loading position.

In such position the clamp plate 65 is also at its opened position, furthest removed from the side 60 of the pack holder (Fig. 20) in which position the clamp plate is held by engagement of the end 96 of the cam 83 with the roller 82 as described hereinbefore.

A group of positive plates 35, negative plates 36 and interleaved separators 37 which has been properly arranged, with the positive and negative lugs 43—44 at the opposite ends of the pack, is now grasped in the hand and dropped into the pack holder 63 with the lugs down, the openings 98 forming clearance for the hand in inserting the group. The sloping surfaces 64 (Fig. 23) also aid in guiding the group into place and it will be readily appreciated that the plates and separators need not be accurately aligned as the group is inserted since the holder itself as it is closed, and the combs are closed, will shift the plates and separators about as necessary to bring them into proper and even alignment. Thus quite haphazardly assembled groups may be used with the fixture making it unnecessary to use complicated mechanisms for assembling the group ready for burning.

As the group is dropped into the holder the intended upper, but at this time lower, edges of the plates and separators will strike the plates 205 on the inner post mold sections 126 limiting the down movement of the group and of course accurately aligning these edges of the individual parts thereof. This also moves the separators 37 so that their intended upper edges register with the corresponding edges of the plates themselves, placing the separators far enough away from the tips of the lugs 43—44 where the casting and burning is to be done to prevent injury to the separators from the heat. Compare the positions of the separators 37 in Figs. 23 and 24 with the final positions in the completed group of Fig. 2.

With the loose group thus inserted in the holder the next step is to move the cam 83 to the second step in Fig. 21 whereat the clamp plate 65 is moved inward against the group far enough to place the plates and separators under a very light pressure. The slide 87 is accurately positioned by the cap screw 90 so that this movement of the cam 83 with its surface 97 in engagement with the roller 82 will relax the lever 74 the desired amount for this purpose, and the slide must, as described, be positioned for each different size of group to be worked upon, after which no further resetting is needed for groups of the same characteristics. With the group under this light pressure the next step is to close the combs and molds (Fig. 24) and this is accomplished by first moving hand lever 115 to the position whereat the cam 110 clears the rollers 112 which permits the spring 147 to move the mold carriers 106 together on the rods 105. This action first moves the comb teeth points 155 between the irregularly positioned plate lugs (Fig. 30) and then the teeth 154 themselves enter and accurately space the lugs and, of course, the plates. The closing motion of the combs further shifts the plates as necessary to align them at their vertical edges and the comb teeth fit substantially liquid tight against the opposite surfaces of the lugs. With the parts of the group thus accurately positioned cam 83 is swung to its clear position of Fig. 22 at which it clears the roller 82 and permits the spring 79 to place the group under firm clamping pressure, whereupon the hand levers 141 are swung apart to close the molds, the outer post and bus bar mold sections 127 and shear gates swinging closed and the inner post mold sections 126 sliding closed by the reverse of the movements just described.

As the mold sections close their meeting faces are brought firmly together under spring pressure by the springs 166 and 181 which move the mold section 127 and shear gate 128 against the inner mold sections 126 thus to provide liquid tight seals between the molds while cast and it is, of course, necessary that the springs 197 be strong enough to hold mold sections 126 to closed position against the inward thrust of the outer parts 127—128 of the molds.

The group is now ready for the casting operation and the fixture is reverted to its starting or casting position, with the molds at the top, by removing the pin 102, swinging hand lever 99 a half turn and again inserting the pin at the opposite side to lock the fixture. The firm clamping engagement with the group will hold it suspended in the holder, with the lugs up, as will be understood.

Molten metal such as lead or a mixture thereof is next poured by any suitable means (not shown) into the gates 129 until the metal rises therein, whereupon the metal will have flowed throughout the casting cavities 200, 201 and 208 and about the upper tip portions of the lugs 43—44 where they are exposed above the comb teeth 154. As stated hereinbefore these cavities are so shaped and related that the bus bars 38—39 and posts 40—41 will thus be cast on the lugs 43 and 44, respectively, and the hot metal will at least in part fuse the tips of the lugs to form a firm mechanical connection of low electrical resistance.

However, as also stated hereinbefore, it is desirable to perform what is known in the art as a burning operation to absolutely insure the proper union between the bus bars and lug tips and with this in mind as the next step in the operation of my fixture the outer sections 127—128 only of both the molds are swung open as seen in Figs. 17 and 26 at the left in both views. This is not done, of course, until the cast metal cools and prior to thus opening the swingable mold sections the hand lever 210 is operated to cause its cross pin 220 to strike the plungers 216 and project them against the bumpers 215 and move the shear gates 128 sidewise, far enough to shear the cooled metal in the gate openings 129 from the metal at the top of the posts along the shear line 209 (Fig. 12) as previously set forth. Hand lever 210 is then released and is thrown back to normal position by action of the springs 217 and 221 as they return the plungers 216 and shear gates 128 to their normal positions.

Now as the swingable mold sections 127—128 are thrown open, which the operator accomplishes by swinging the hand levers 141 sharply inward, the cross bars 157 strike the bumper bars 226 a sharp blow, sufficient to dislodge and cast aside into the clear and in opposite directions the waste of the castings, which remain in the gates 129 following the shearing operation. So that the waste will not fall until the bumper bars are struck, and thus possibly fall into undesired places, the wall surfaces 204 of the openings 129 are provided near their lower edges with shallow tapered and angularly formed grooves 229 which are so shaped that they will cast slight projections in the sides of the waste, so shaped as to hold them in place until they are inverted and the molds strike the bumper bars 226 and then to allow the waste to be thrown at controlled angles, downwardly and outwardly out into the clear.

With the swingable sections 127—128 of the molds thus opened the upper surfaces of the bus bars 38—39 directly over the lugs 43—44 are now exposed and a torch (not shown) or any other suitable source of heat may be run along or brought to bear on these surfaces to apply further heat and thoroughly burn the bus bars and lug tips into a firm bond. This burning may be done autogenously or metal may be added in the process whichever is desired and as conditions dictate.

When the castings have then cooled the fixture is inverted again to its loading-unloading position by the hand lever 99 and relocked by pin 102. The inner post mold sections 126 are now opened and the comb teeth 154 withdrawn from between the lugs 43—44 and from beneath the castings by moving hand lever 115 to again spread the mold carriers 106, returning the parts to the positions of Fig. 23, whereupon cam 83 is returned to the position of Fig. 20 to clear the clamp plate 65 from the group, which may then be removed by hand. The fixture is now in position for re-loading for the next operation cycle.

The group, with the bus bars and posts cast in place, is now reverted to its proper position (lugs up) and is dropped on a smooth surface so that the separators 37 will be driven up to their normal positions between the plates, at which the upper edges of the separators project up above the edges of the plates and the group is ready for installation in the battery.

The various manipulations of the hand levers 99, 115, 141 and 210, and of cam 83, in carrying out the operations just described may be accomplished rapidly with a little practice and while the operation here has required description at considerable length, it is so straightforward and simple that but little time will be required for the production of finished groups or packs. Actually little if any additional time will be required as compared with the application and burning of the pre-cast posts as now the practice and the saving is thus very important.

It is, of course, necessary to change the molds and combs when plates of different thicknesses are used and for this purpose it is only necessary to remove the cap screws 125 whereupon the entire mold assembly will lift off, the pinions 134 disengaging from the sectors 136 and the yokes 187 lifting off the rollers 188. As the new mold-comb assembly is then lowered into place its pinions 134 and yokes 187 will reengage their actuating parts and the cap screws 125 need only be replaced then to secure the new assembly in place. Aside from shifting the cam slide 87 this is the only change required in the fixture for accommodating battery groups of different characteristics.

Figure 31:
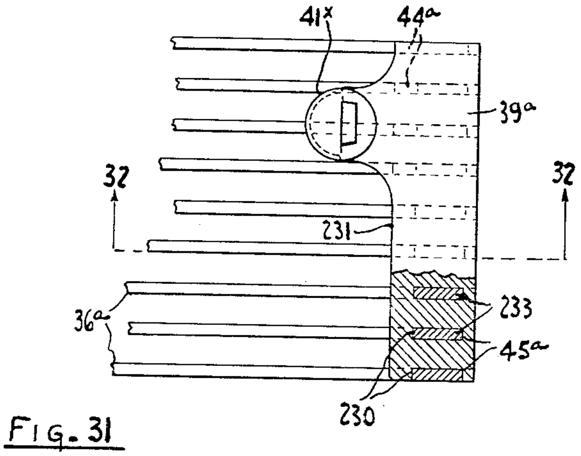
Fig. 31 is a plan view of the end portions of a group of plates of one polarity showing a modified joinder of the lugs and bus bars, particularly designed to save metal without reducing current carrying capacity, and with an end portion of the bus bar and associated lugs in section. This view is taken substantially along the line 31—31 in Fig. 32.
Figure 32:
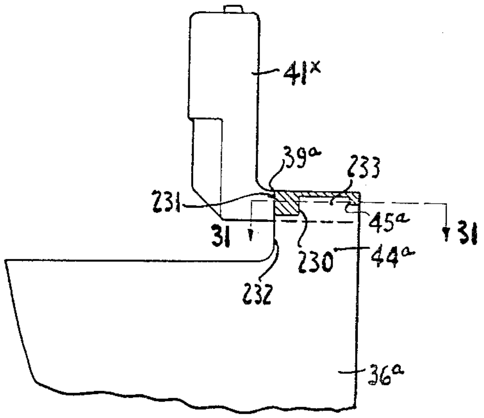
Fig. 32 is a sectional and elevational detail view of the assembly of Fig. 1 along the line 32—32.

On this point, as discussed in detail hereinbefore, the notching (45) of the lugs 43—44 so that the width of the bus bars 38—39 may be reduced without a sacrifice in firm mechanical connections between bus bars and lugs is very important. This saving may be increased by the modified bus bar formation of Figs. 31 and 32 in which the lugs 44ª (only negative plates 36ª being here shown for convenience sake but it being understood that the same holds for the positive plates as well) are again notched at outer upper corners 45ª, but in addition have wider, deeper notches 230 at these inner, upper corners. Now by only the minor variation in the shaping of the bus bar casting cavities 208 the inner edge 231 of the bus bar 39ª may be aligned with the corresponding inner edges 232 of the lugs 44ª and the overall width of the bus bar 39ª very considerably reduced. Figs. 31 and 32 are enlarged in scale as compared with Figs. 1–5 but it will be clear that the saving of metal in the aggregate, in large daily production of batteries, will be very great. The terminal post is here designated at 41.

The double notches 45ª—230 of the lugs still permits the cooling metal of the cast bus bar to have a shrinking gripping effect on the tips 233 of the lugs and the cross sectional area of the bar, even thus reduced in the width, is more than adequate to carry the current.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A device of the character described for accurately grouping interleaved lugged battery plates and separators and for casting bus bars and terminal posts on the upper tips of the plate lugs of like polarity, comprising in combination, a frame having a pack holder, means reversably mounting the frame whereby it may be turned to one position and a group of plates and separators inserted in the holder with the plate lugs down and then inverted and the group held with the lugs up, means for clamping the group in the holder, retractable comb members operative adjacent the holder for interdigitation with the lugs and forming molten metal seals between their tips and the plates and separators, cooperating mold members and means supporting the mold members on the frame for relative opening and closing movements, the said mold members having cooperating recesses communicating with the tips of the lugs for casting the bus bars and terminal posts, said comb members fitting the outer edges of the lugs and closing the cavities so that the bus bars are cast flush at their outer edges with these edges of the lugs, and said lugs having notches in their tips at their outer edges to receive metal forming part of the bus bars.

2. A device of the character described for accurately grouping a pack of interleaved lugged battery plates and separators and for casting bus bars and terminal posts on the upper tips of the plate lugs of like polarity, comprising in combination, a frame having a holder, means reversably mounting the frame whereby it may be turned to one position and a group of plates and separators inserted in the holder with the plate lugs down and then inverted and the group held with the lugs up, means for clamping the group in the holder, retractable comb members operative adjacent the holder for interdigitation with the lugs and forming molten metal seals between their tips and the plates and separators, cooperating mold members and means supporting the members on the frame for relative opening and closing movements, the said mold members having cooperating recesses communicating with the tips of the lugs for casting the bus bars and terminal posts, said comb members fitting the outer edges of the lugs and closing the cavities so that the bus bars are flush at outer edges with these edges of the lugs, and said lugs having notches in their tips at the opposite inner and outer edges of the lugs to receive part of the metal forming said bus bars.

3. In a fixture for casting a pair of terminal posts and bus bars upon the lugs of a group of negative and positive battery plates and including a support and a holder thereon for holding the group of plates with their lugs upwardly extended and having comb-like members with teeth retractibly extending between the lugs to uniformly space the same and form molten metal seals between the tips of the lugs and the plates proper; the improvement which comprises two pairs of cooperating mold sections having terminal post and bus bar molding cavities communicating with the said teeth and the lugs and having pouring gates for directing molten metal down into said cavities, means operatively and relatively movably supporting each pair of said mold sections on said support, and means operatively associated with one mold section of each pair for moving the same to an open position exposing the upper surface only of the cast bus bar for application of heat thereto to burn the bus bar to the lug tips.

4. In a fixture for casting a pair of terminal posts and bus bars upon the tips of the lugs of a group of negative and positive battery plates, said fixture including a support and a holder thereon for holding the group of plates with their lugs upwardly extended and comb-like members associated with the holder and having teeth retractibly extending between the lugs to uniformly space the same and form molten metal seals between the tips of the lugs and the plates proper; the improvement which comprises two pairs of cooperating mold sections having terminal post and bus bar molding cavities communicating with the said teeth and the lug tips and having pouring gates for directing molten metal down into said cavities, means operatively and relatively movably supporting each pair of said mold sections on said support, means operatively associated with one mold section of each pair thereof for moving the same to an open position exposing one surface only of each cast bus bar for application of heat thereto to burn the bus bar to the lug tips, and means for subsequently opening the other mold section of each pair thereof to free the bus bars and posts.

5. In a fixture for casting a terminal post and bus bar upon the tip portions of the lugs of a group of battery plates and including a support and a holder thereon for holding the group of plates with their lugs upwardly extended and comb-like member having teeth retractibly extending between the lugs to uniformly space the same and form molten metal seals between the tip portions of the lugs and the plates proper; the improvement which comprises a pair of cooperating mold sections operatively arranged above the support and one having a terminal post casting cavity and the other having a post casting cavity and means cooperating with the comb-like member to form a bus bar casting cavity, all of said cavities communicating with the tip portions of the lugs, means forming a pouring gate for directing molten metal down into said cavities, and means operatively supporting one of the mold sections for swinging movement clear of the cast post and bus bar, to leave the bus bar in its casting cavity but with a surface of the bar exposed for the application of heat thereto to burn the bus bar to the lugs.

6. In a fixture for casting bus bars and terminal posts upon the respective lugs of a group of negative and positive battery plates and which includes a support and a holder thereon for releasably holding the group of plates with their lugs extending upwardly; the improvement which comprises comb plates having teeth retractibly extending between the plate lugs forming seals between the tips of the lugs and the plates proper, means reciprocatably mounting the comb plates on the support, a pair of molds each including cooperating mold sections having molten metal receiving cavities for casting the terminal posts and said cavities communicating with the lugs above the teeth, the mold sections also having surfaces cooperating with the comb plates and their teeth to define in conjunction therewith a pair of cavities for casting bus bars on the lugs above the teeth of the comb plates, separate means adjustably mounting each mold section upon the support and including pivot means for one mold section of each pair about which that mold section may be swung upward to expose a surface of the bus bar while it otherwise is confined in its casting cavity for performing a burning operation upon the bar.

7. In a fixture for casting bus bars and terminal posts upon the respective lugs of a group of negative and positive battery plates and which includes a support and a holder thereon for releasably holding the group of plates with their lugs extending upwardly; the improvement which comprises comb plates having teeth retractibly extending between the plate lugs forming seals between the tips of the lugs and the plates proper, means retractibly mounting the comb plates on the support, a pair of molds each including cooperating mold sections having molten metal receiving cavities for casting the terminal posts and said cavities communicating with the lug tips above the comb-plate teeth, the mold sections also having surfaces cooperating with the comb plates and the teeth thereon to define in conjunction therewith a pair of cavities for casting bus bars below said posts and upon the tips of the lugs, pivot means mounting one mold section of each pair on the support for pivot movement by which that mold section may be swung upward to expose the top of the bus bar while it otherwise is confined in the casting cavity for performing a burning operation upon the bar, and means slidably mounting the other mold section of each pair on said support for clearing the cast posts and bus bars following such burning operation.

8. In a fixture for casting bus bars and terminal posts upon the tips of the lugs of a group of negative and positive battery plates and which includes a support and a holder thereon for releasably holding the group of plates with their lugs extending upwardly; the improvement which comprises comb plates having teeth retractibly extending inward between the plate lugs forming seals between the tips of the lugs and the plates proper, means retractibly mounting the comb plates on the support above the said holder, a pair of molds each including a pair of cooperating mold sections having molten metal receiving cavities for casting the terminal posts and said cavities communicating with the lug tips, one mold section of each pair having also a pouring gate leading to said cavities, the mold sections also having surfaces cooperating with the comb plates to define in conjunction with the teeth thereon a pair of cavities for casting bus bars upon said posts and upon the tips of the lugs, separate means mounting the mold sections of each pair upon the support for independent opening movements so that one mold section of each pair may be opened to expose the upper surface of the bus bar while it remains otherwise confined in the casting cavity for performing a burning operation upon the bar and then the castings cleared by opening the remaining mold sections, and means operative in conjunction with said pouring gates for shearing waste metal remaining on the gates after the cavities are filled.

References Cited in the file of this patent

UNITED STATES PATENTS

| | | |
|---|---|---|
| 1,235,779 | Engel | Aug. 7, 1917 |
| 1,545,051 | Hazelett | July 7, 1925 |
| 1,776,327 | Sentkowski | Sept. 23, 1930 |
| 1,811,292 | Barhoff | June 23, 1931 |
| 1,948,120 | Lormor | Feb. 20, 1934 |
| 2,265,413 | Young | Dec. 9, 1941 |
| 2,483,808 | Carpenter | Oct. 4, 1949 |
| 2,516,546 | Brown | July 25, 1950 |
| 2,542,503 | Galloway | Feb. 20, 1951 |